(12) United States Patent
White et al.

(10) Patent No.: US 8,083,593 B2
(45) Date of Patent: Dec. 27, 2011

(54) RECORDING MEDIA ON GAMING CONSOLES

(75) Inventors: Jason White, Seattle, WA (US); Todd Roshak, Redmond, WA (US); Chris Turkstra, Woodinville, WA (US); Logananth Seetharaman, Kirkland, WA (US); Timothy Milligan, Redmond, WA (US); Stacey Law, Redmond, WA (US); Anthony Discolo, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 650 days.

(21) Appl. No.: 11/620,625

(22) Filed: Jan. 5, 2007

(65) Prior Publication Data

US 2008/0167133 A1 Jul. 10, 2008

(51) Int. Cl.
*G06F 17/00* (2006.01)
(52) U.S. Cl. .......................................... 463/43
(58) Field of Classification Search .............. 463/40–43; 725/132
See application file for complete search history.

(56) References Cited

U.S. PATENT DOCUMENTS

| | | | |
|---|---|---|---|
| 5,018,060 A | 5/1991 | Gelb et al. | |
| 5,592,609 A | 1/1997 | Suzuki et al. | 345/473 |
| 5,768,566 A | 6/1998 | Harikrishnan et al. | |
| 5,984,548 A | 11/1999 | Willner et al. | |
| 6,688,984 B2 | 2/2004 | Cole | 463/46 |
| 6,727,920 B1 | 4/2004 | Vineyard et al. | |
| 6,769,989 B2 | 8/2004 | Smith et al. | |
| 6,929,549 B1 | 8/2005 | Yamada | 463/42 |
| 6,961,904 B2 | 11/2005 | Pilu | |
| 7,136,882 B2 | 11/2006 | Collins et al. | |
| 7,303,476 B2 * | 12/2007 | Blanco | 463/43 |
| 7,452,279 B2 * | 11/2008 | Yamashita | 463/43 |
| 7,801,419 B2 | 9/2010 | Sakai et al. | |
| 2002/0077177 A1 * | 6/2002 | Elliott | 463/40 |
| 2002/0078176 A1 | 6/2002 | Nomura et al. | 709/219 |
| 2002/0128068 A1 | 9/2002 | Whitten et al. | |
| 2002/0137565 A1 | 9/2002 | Blanco | |
| 2002/0142845 A1 | 10/2002 | Whitten et al. | 463/43 |
| 2002/0147979 A1 | 10/2002 | Corson | 725/90 |
| 2003/0065873 A1 | 4/2003 | Collins et al. | |
| 2003/0211889 A1 | 11/2003 | Walker et al. | |
| 2003/0232648 A1 | 12/2003 | Prindle | |

(Continued)

FOREIGN PATENT DOCUMENTS

JP 08-130728 A 5/1996

(Continued)

OTHER PUBLICATIONS

Adaptec, Inc., "Adaptec GameBridge TV AVC-1410," *Gaming Data Sheet*, 2005, 2 pages.

(Continued)

*Primary Examiner* — Ronald Laneau
(74) *Attorney, Agent, or Firm* — Woodcock Washburn LLP

(57) ABSTRACT

An integrated gaming and media experience is disclosed, including recording of content on a gaming console. A digital video recorder (DVR) application running alongside a television client component allows users to record media content on the gaming console. The DVR application also integrates itself with the console menu. Once integrated, users can record media content while playing games. Alternatively, users can record content when the gaming console is turned off. The recorded content can include television programming, gaming experience (whether local or online), music, DVDs, and so on. When in the recording state, users can also switch between various other media modes, whether gaming, television, and so on.

17 Claims, 29 Drawing Sheets

U.S. PATENT DOCUMENTS

| | | | |
|---|---|---|---|
| 2004/0002987 A1 | 1/2004 | Clancy et al. | |
| 2004/0162759 A1 | 8/2004 | Willis | |
| 2004/0163134 A1 | 8/2004 | Willis | 725/133 |
| 2005/0148377 A1 | 7/2005 | Goldberg et al. | |
| 2005/0235209 A1 | 10/2005 | Morita et al. | |
| 2005/0245314 A1 | 11/2005 | Pirich et al. | |
| 2006/0058100 A1 | 3/2006 | Pacey et al. | |
| 2006/0136246 A1 | 6/2006 | Tu | |
| 2006/0184989 A1 | 8/2006 | Slothouber | |
| 2006/0218604 A1 | 9/2006 | Riedl et al. | |
| 2006/0246988 A1 | 11/2006 | Walker et al. | |
| 2006/0252498 A1 | 11/2006 | Walker et al. | 463/20 |
| 2006/0252545 A1 | 11/2006 | Haque et al. | 463/42 |
| 2006/0258459 A1* | 11/2006 | Davis et al. | 463/40 |
| 2006/0288308 A1 | 12/2006 | Enomoto et al. | |
| 2006/0294568 A1 | 12/2006 | Walter | |
| 2007/0101364 A1 | 5/2007 | Morita | |
| 2008/0167128 A1 | 7/2008 | Roshak et al. | |
| 2008/0167133 A1 | 7/2008 | White et al. | |
| 2008/0195744 A1* | 8/2008 | Bowra et al. | 709/231 |
| 2008/0307485 A1* | 12/2008 | Clement et al. | 725/152 |
| 2008/0310825 A1* | 12/2008 | Fang et al. | 386/124 |

FOREIGN PATENT DOCUMENTS

| | | |
|---|---|---|
| JP | 2003-006090 A | 1/2003 |
| JP | 2003-069905 A | 3/2003 |
| KR | 2001/0000558 | 1/2001 |
| WO | WO 03/047710 | 6/2003 |
| WO | WO 2004/018060 A2 | 3/2004 |

OTHER PUBLICATIONS

"Xbox Windows Media Center Extender," Xbox.com, downloaded Feb. 7, 2007, http://www.xbox.com/en-US/hardware/w/winmediacenterextender/, 2 pages.

Sony Computer Entertainment America, Inc., "PlayStation Portable—About PSP," PlayStation.com. http://www.us.playstation.com/PSP/About, 2006, 1 page.

"Adaptec GameBridge TV AVC-1410", Adaptec, Inc., Gaming Data Sheet, 2005, 2 pages.

"New Feelings for Sony PSX", Modern TV Technology, May 31, 2004, p. 153.

"Xbox Windows Media Center Extender", Xbox.com, http://www.xbox.com/en/US/hardware/w/winmediacenterextender/, accessed Feb. 7, 2007, 2 pages.

Anan Lal Shimpi, "Microsoft Windows XP Media Center Edition 2005: Feature and Performance Investigation", Oct. 12, 2004, available at: www.anandtech.com/show/1508, 22 pages.

Informitv, "Microsoft Offers IPTV on its Xbox 360 Games Console", http://informity.com/articles/2007/01/08/microsoftoffersiptv, Jan. 8, 2007, 2 pages.

Kendrick, "Indrema Informer: About the Indrema", http://www.newbreedsoftware.com/bill/indrema/specs/, 2001, 7 pages.

Trademark Registration No. 2480809, Comcast, Aug. 21, 2001, 2 pages.

* cited by examiner

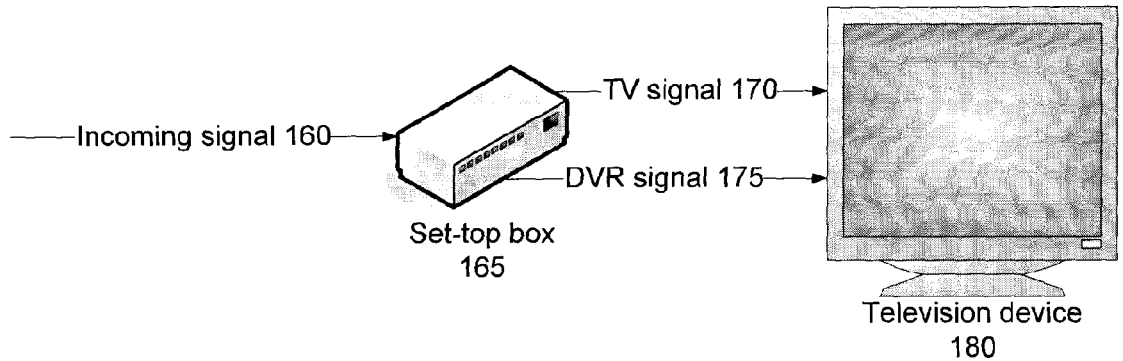
Prior Art Fig. 1
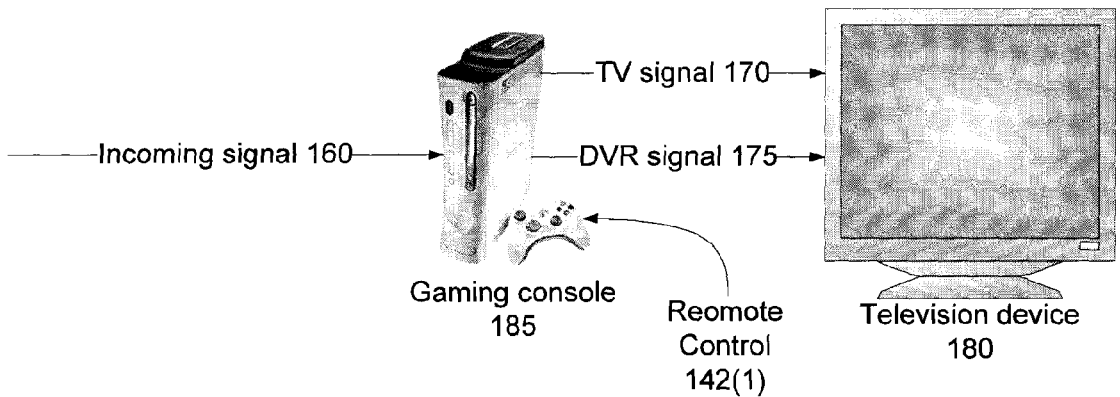
Fig. 2

RECORDING MEDIA ON GAMING CONSOLES

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2006, 2007 Microsoft Corp.

CROSS-REFERENCE TO RELATED SUBJECT MATTER

The presently disclosed subject matter is related to the following applications: U.S. application Ser. No. 11/620,624, filed Jan. 5, 2007, entitled "Television Viewing on Gaming Consoles," and U.S. application Ser. No. 11/620,620, filed Jan. 5, 2007, entitled "Integration of Media on Gaming Consoles."

FIELD OF TECHNOLOGY

The presently disclosed subject matter relates to the field of computing, and more particularly, to fields such as gaming and media content, although these are merely exemplary and non-limiting fields.

BACKGROUND

Gaming consoles provide a rich audio and visual experience that is underwritten by extensive computing resources. However, these computing resources are often times not leveraged for non-gaming uses. Thus, it would be advantageous to provide, in addition to gaming entertainment, other media experiences, such as television viewing, recording of content (whether television, gaming, or otherwise), and so on. In short, it would be advantageous to provide systems, methods, computer readable media and the like that would allow for integrated gaming and media experience.

SUMMARY

Various aspects disclosed herein provide for an integrated gaming and media experience. By way of example and not limitation, in one aspect, a digital video recorder (DVR) application allows users to record media content on a gaming console. The DVR application also integrates itself with the console menu. Once integrated, users can record media content while playing games (or they can record content at other times also). The recorded content can include television programming, gaming experience (whether local or online), music, DVDs, and so on. Users are also given various choices when it comes to DVR, such as choosing resource allocation for recording of content and for system performance.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are illustrated. However, the disclosure is not limited to the specific aspects shown. The following figures are included:

FIG. 1 illustrates a prior art system where an incoming signal is received at a set-top box, and this signal is processed by the set-top box;

FIG. 2, in contrast to FIG. 1, illustrates that gaming consoles can be used process and display media content a la set-top boxes;

FIG. 16 illustrates the manner in which a client component can be authenticated and signed-in;

DETAILED DESCRIPTION

I. Overview

Figure 3:
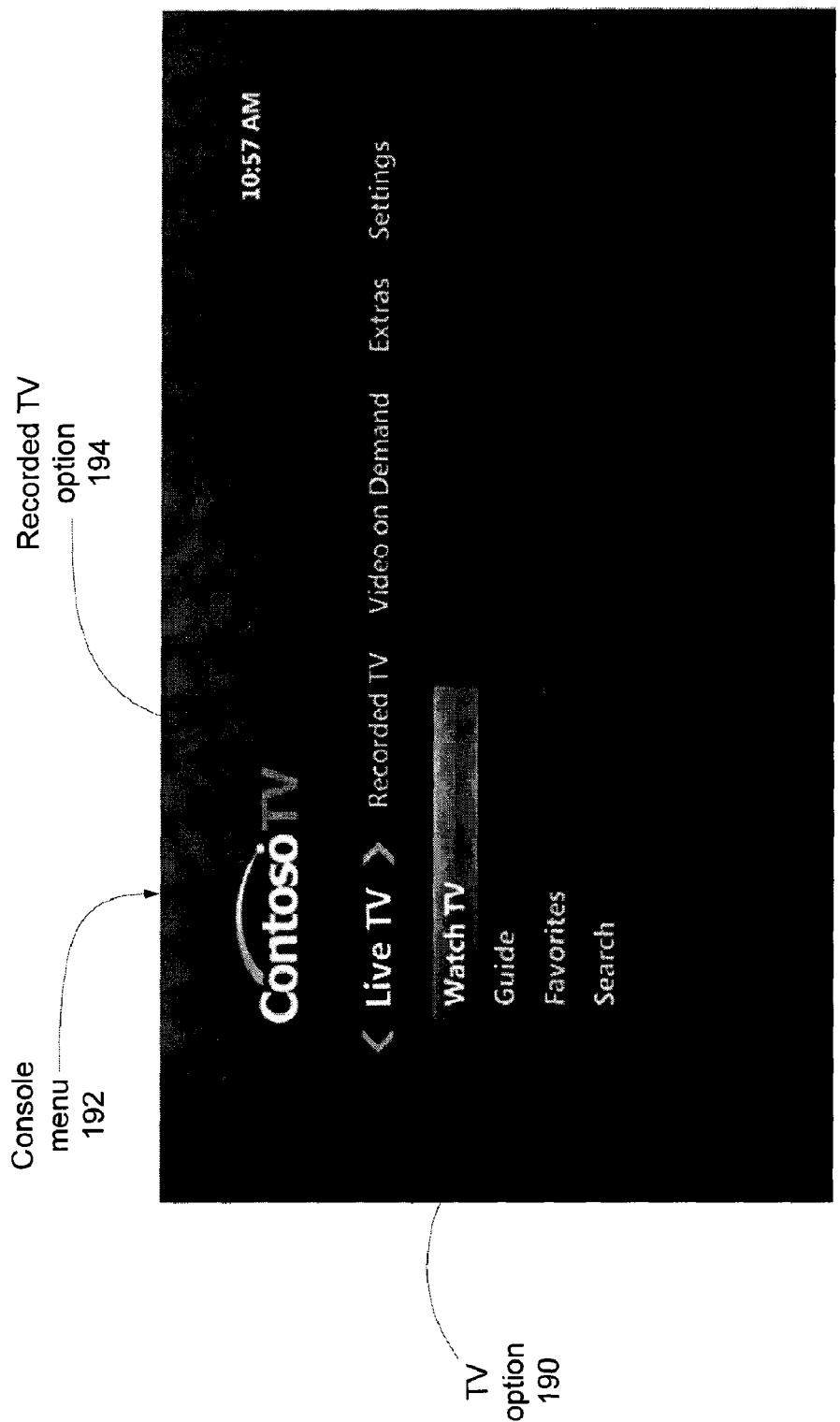
FIG. 3 illustrates that once the gaming console is processing and/or displaying incoming signals, users can select, using a console menu, the service they want to use.

In various aspects of the present disclosure, systems, methods, computer readable media and the like are discussed that address the problems of providing television (TV), digital video recording (DVR), and integration of resources on gaming consoles. By way of example and limitation, FIGS. 1 and 2 lay out the framework for the remained of the disclosure. In FIG. 1, a prior art system is shown where an incoming signal 160 is received at a set-top box 165, and this signal 160 is processed by the set-top box 165. This processing may entail the separation of different kinds of signals. For example, one type of signal that may be relayed from the set-top box 165 to a television device 180 is a TV signal 170. This signal 170 may contain content that is displayed in the form of a channel on the television device 180, and the content may be a TV program, a movie, music, etc., in other words, just about any media content. Moreover, this media content can be recorded by the set-top box 165 and then displayed on the television device 180 in the form of a DVR signal 175.

FIG. 1, of course, presents the simple prior art scenario. In contrast to FIG. 1, however, FIG. 2 illustrates the notion that a gaming console can be used process and display media content. Thus, per FIG. 2, an incoming signal 160 from some communications company can be received by the gaming console 185. The gaming console 185 can process this signal (or a plurality of other signals from the same source or other sources) and then present it to the television device 180. The gaming console 185 can present a TV signal 170 and/or a DVR signal 175 to the television device 180. The DVR signal 175 may be just recorded content of the incoming signal 160 (which may contain a TV signal or just about any other digital or analog signal), or the DVR signal 175 can contain other media content that has been recorded (e.g. gaming content). In short, FIG. 2 shows that the gaming console 185 has the ability to not only use its vast computing resources for the traditional gaming entertainment purposes, but also for allowing users to watch TV using the console 185 as a set-top box and/or record content to be displayed on the TV device 180 (or used otherwise, for archiving purposes or the like).

It should be noted that because the gaming console 185 can be leveraged to act as a set-top box, traditional accompanying console devices, such as controllers, can play set-top box roles. For instance, gaming console controllers 142(1), explained in further detail with reference to FIG. 30 (last Fig.) of this disclosure, can act as a remote control devices to control the gaming console/set-top box 185. Thus, the gaming console 185 controllers 142(1) can be used to switch channels on the television devices 180 and to perform any functionality of a traditional remote control device. Alternatively, the gaming console 185 can also be used in conjunction with a traditional set-top box, thereby using existing resources or acting as an add-on to existing resources (instead of entirely replacing them).

Turning now to FIG. 3, once the gaming console 185 is processing and/or displaying incoming signals 160, users can select, using a console menu 192, the service they want to use. For example, users may want to watch TV, in which case they would select the "Watch TV" option 190. Alternatively, they could just as easily select the "Recorded TV" option 194 shown in the FIG. 3 screen shot. This option 194 may provide access to content that was either recorded while the user was playing a game on the gaming console 185, or before or after such playing. The recorded content could have been the game itself, or it could have been television content (recorded, before, during, or after playing video games on the gaming console 185).

Figure 30:
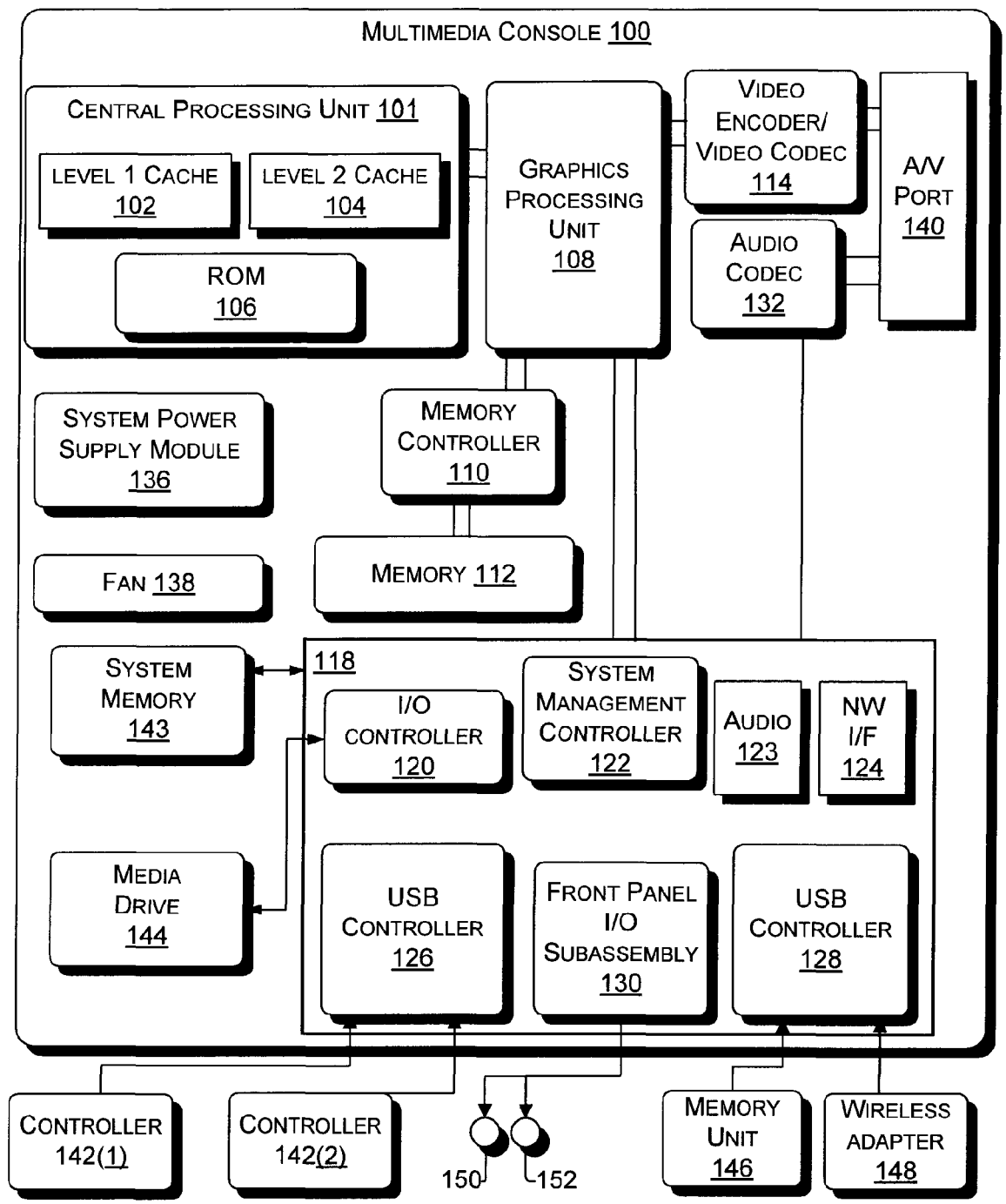
FIG. 30 illustrates a block diagram that shows an exemplary multimedia console that may be used in association with the aspects discussed above.

It goes without saying that the gaming console 185 also provides a plurality of other services, such as video on demand and other extras. In short, the gaming console 185 can provide any service a set-top box 165 (see FIG. 1) can provide—and more, since the gaming console 185 can be a general computing device capable of running any software application provided to it (whether via the Internet, an optical disc drive, a flash drive, or otherwise—as is shown in FIG. 30).

Figure 4:
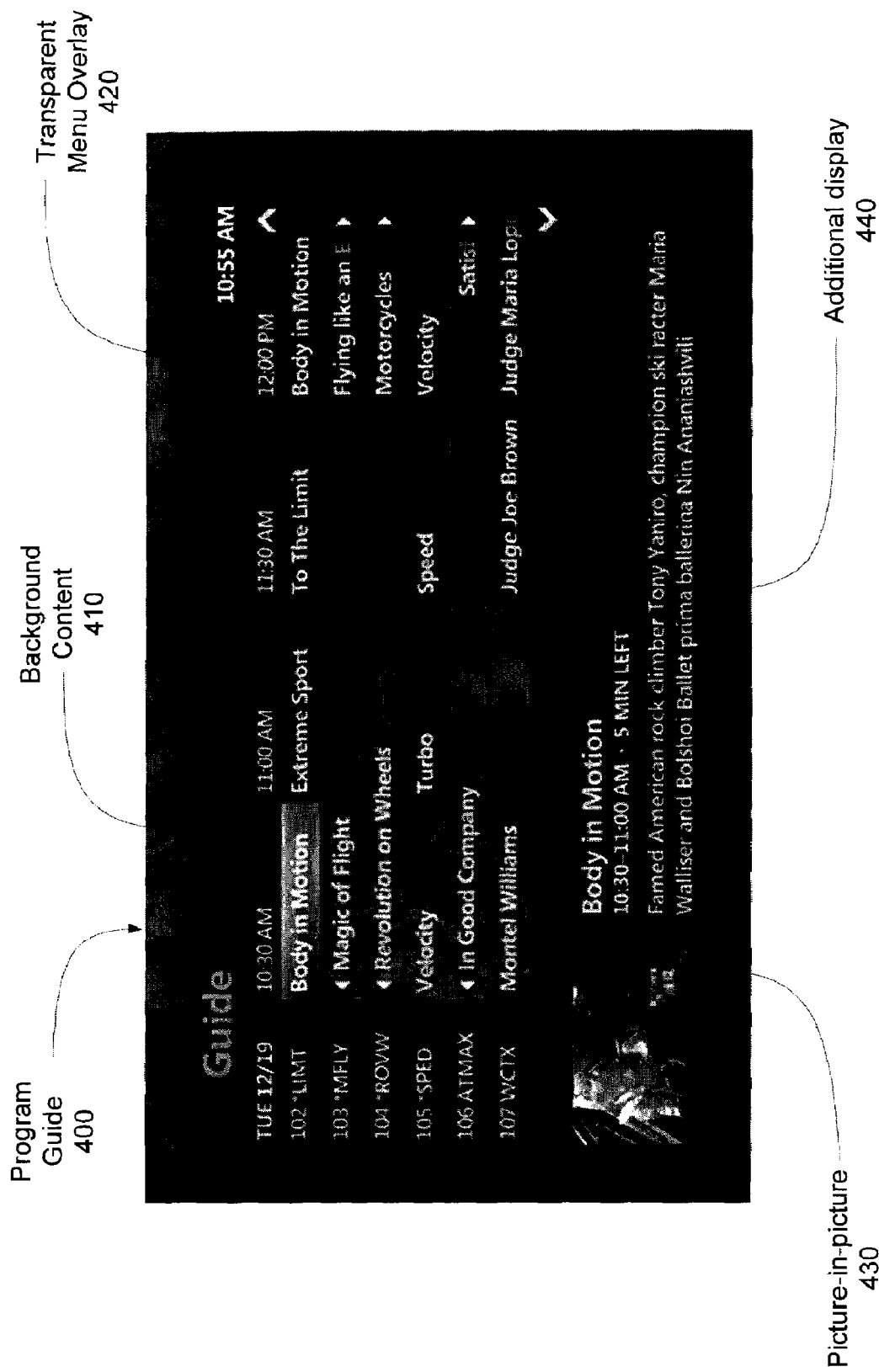
FIG. 4 illustrates that the gaming console also provides a program guide that is suitable for TV watching.

Next, FIG. 4 illustrates that the gaming console 185 also provides a program guide 400 that is suitable for TV watching. This program guide 400 can comprise of some background content 410 and an overlay, such as a transparent menu overlay 420. The background content 410 may be some TV image or some other digital picture, while the transparent menu overlay can be transparently placed on top of the background content 410. The overlay 420 can show the different channels, times, and corresponding shows. It can also display other features, such as picture-in-picture display 430, or some additional ticker/textual/picture display 440. Those of skill in the art will readily appreciate the different kinds of menus and displays that are shown with TV content (and with DVR content, for that matter). All these aspects are contemplated herein, and the aspects discussed with reference to FIGS. 3 and 4 are merely exemplary and non-limiting, meant to show merely a subset of the set of capabilities of the gaming console 185 acting as a set-top box.

II. Viewing Television on a Gaming Consoles

In this aspect of the present disclosure, the capabilities of gaming consoles are further explored, and it is shown how such consoles can be used as a means to display television signals, essentially replacing set-top boxes.

For example, one type of signal that gaming consoles can display is Internet Protocol Television (IPTV) signals. These IPTV signals may be the incoming signals 160 discussed with reference to FIG. 1. In any case, IPTV describes a system where a digital television service is delivered using the Internet Protocol over a network infrastructure, which may include delivery by a broadband connection or a digital subscriber line (DSL) connection. The gaming console can manage various types of signals, but IPTV is especially facile to use because it is strictly software based (to be distinguish from other signals, such as cable television or satellite television, which are at least in part, hardware based—using digital receivers/tuners and so on). Although, it should be noted, that the consoles can handle these and other kinds of signals. IPTV signals are discussed herein as merely illustrative and exemplary signals.

To further the above example, an IPTV signal client can be treated as a game on a gaming console, or, to put it differently, it can be handled as a specific type of application that runs on a gaming console. In one non-limiting aspect of the present disclosure, a managed framework can run on top of gaming console hardware, and an IPTV application, in turn, can run on top of this managed framework. Various modules and interfaces can be used in or between the hardware, managed framework, and the IPTV application, to enable the running of television signals on top of gaming consoles. For example, unique network input/output (I/O), security, and other protocols and functionalities can be used. In the security example, security features can be used to protect theft of television content. In the I/O example, communications can be managed between applications, frameworks, and hardware, as well as I/O to the gaming console itself.

Figure 5:
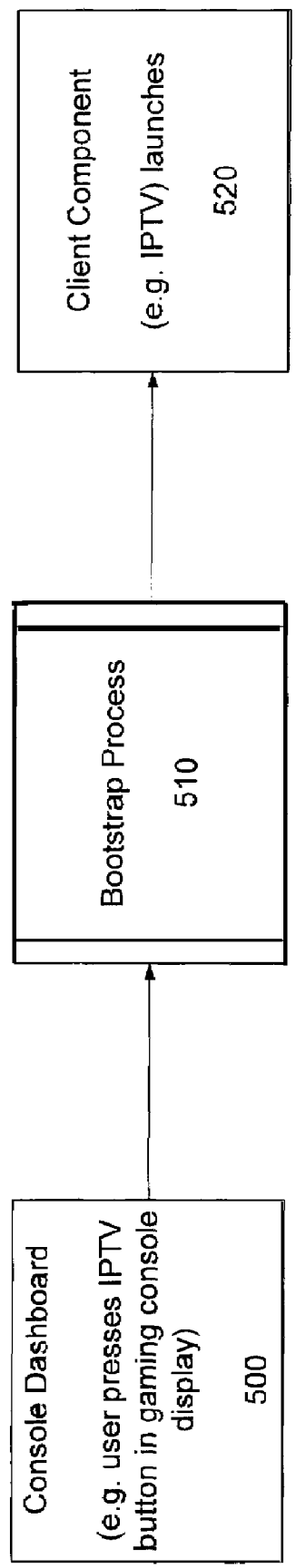
FIG. 5 shows that a bootstrap process can sit between a gaming console dashboard and a client component 520, which eventually allows for watching television on a gaming console.
Figure 6:
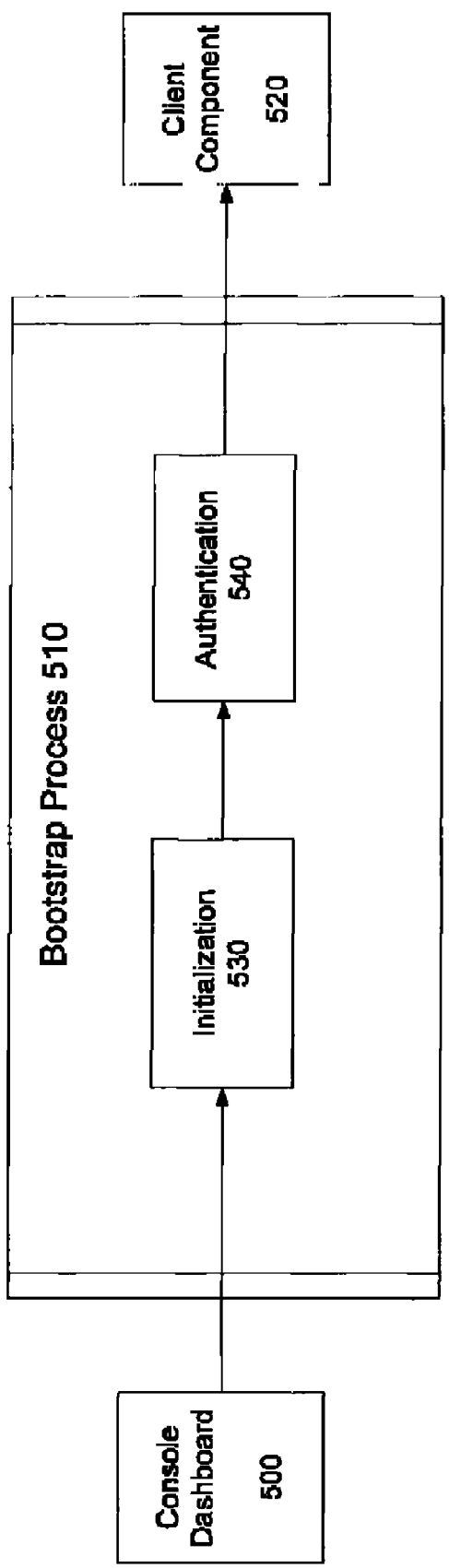
FIG. 6 shows in more detail the bootstrap process FIG. 5.

Turning now to FIG. 5, a bootstrap process 510 can sit between a gaming console dashboard 500 (see for example the dashboard of FIG. 10) and a client component 520. It can be initiated every time a user presses a TV button (e.g. an IPTV button) on a media blade (see for example FIG. 13) to bootstrap into the client 520. The bootstrap process 510 can launch, for example, an IPTV client (but, does not have to authenticate the client with an IPTV bootstrap web service—this can be done via the IPTV client and can happen independently of the bootstrap mechanism Next, FIG. 6 shows in more detail the bootstrap process 510 of FIG. 5. Specifically, proceeding from left to right in FIG. 6, a user can press a media button, such as an IPTV button at box 500. Then, following this event, a bootstrap application initiates 530. This application 530 can be responsible for managing the initial stages of the bootstrap process 510. The first action this application 530 can perform is to perform authentication 540, and then check for presence of the client component 520. If the client component 520 is present then it can be launched, but if it is not it can be downloaded from a server. In any case, the authentication 540 can be performed either every time the client component 520 is launched, or alternatively, if the client is already launched 520 and merely in background as other media is being played, it does not need to be authenticated.

Figure 7:
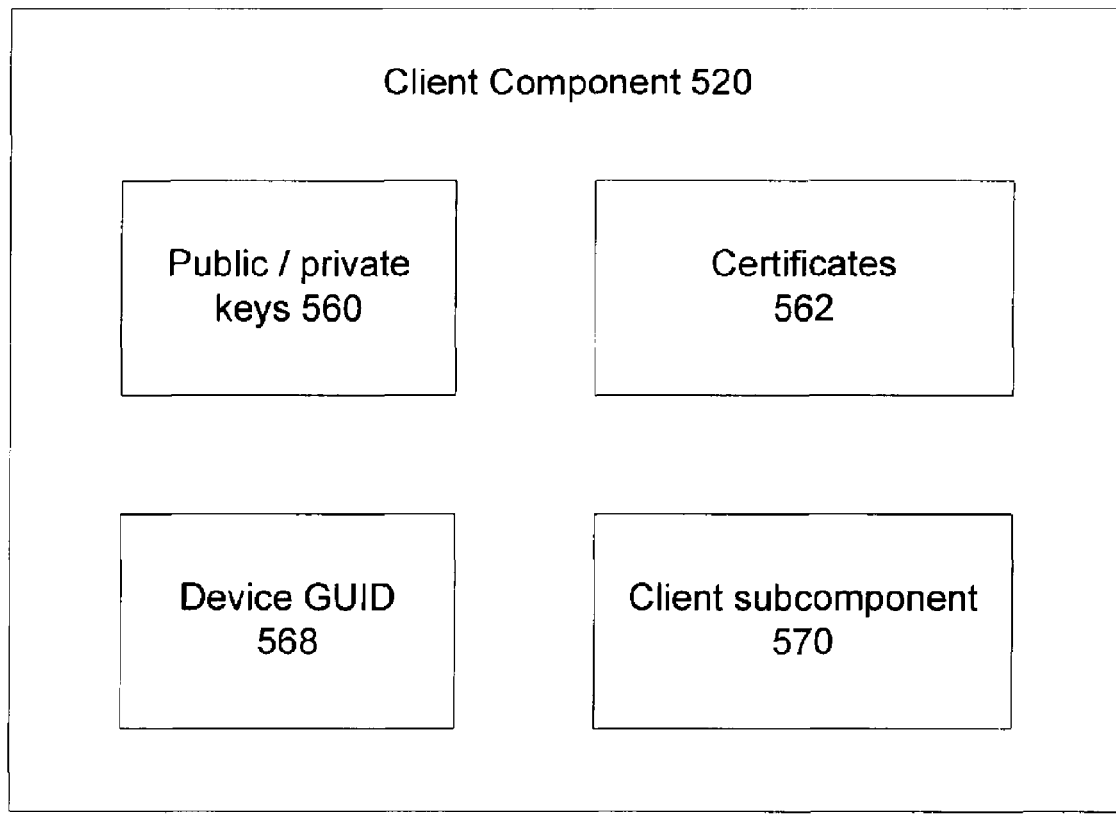
FIG. 7 focuses on the client component discussed with reference to FIGS. 5 and 6.

FIG. 7 shows in more detail the information that may be handled by the client component that relates to authentication and/or login. Specifically, there may be public/private keys 560 and/or certificates 562 that are used in the process. Also, as FIG. 8 explains below, information may be provided that relates to gaming console GUIDs. Lastly, a client subcomponent 570 may be present in the client component 520 that performs specific tasks, such as the actual running of television once the client component 520 is launched (for more detail, see e.g. FIG. 17).

Figure 8:
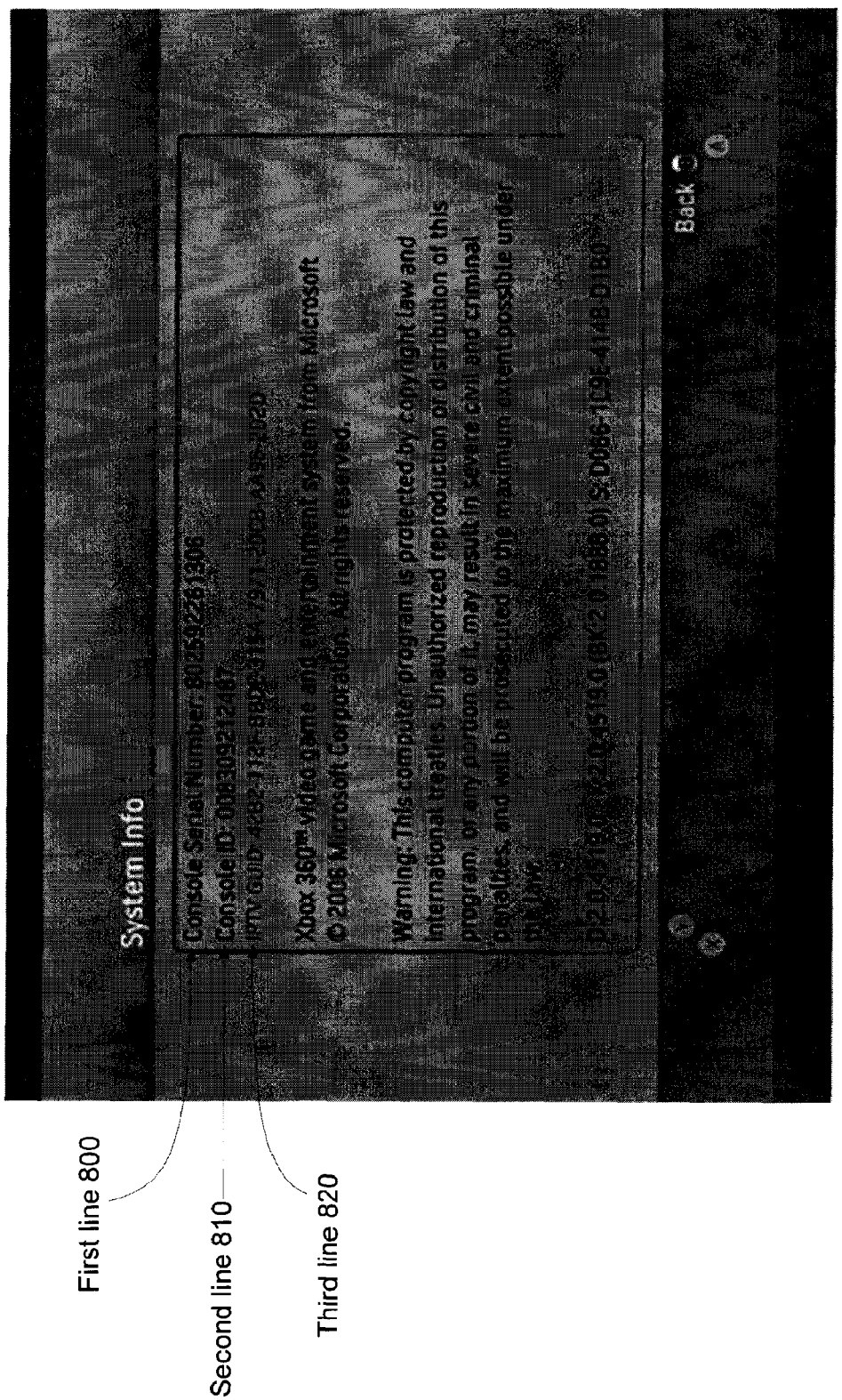
FIG. 8 illustrates an exemplary GUID, serial number, and console number used in the setup of the television component.

FIG. 8, as just mentioned, illustrates an exemplary GUID and serial number. In the first line 800 of the provided screen shot, the following console serial number appears: 802592261306. And, in the second line 810, a console ID is shown: 008309212487. The following GUID can then be generated using the above algorithm: 4282-112F-BBDE-315A-7971-20CB-AA96-202D, as is shown in the third line 820. Other information related to the gaming console may appear to users.

Figure 9:
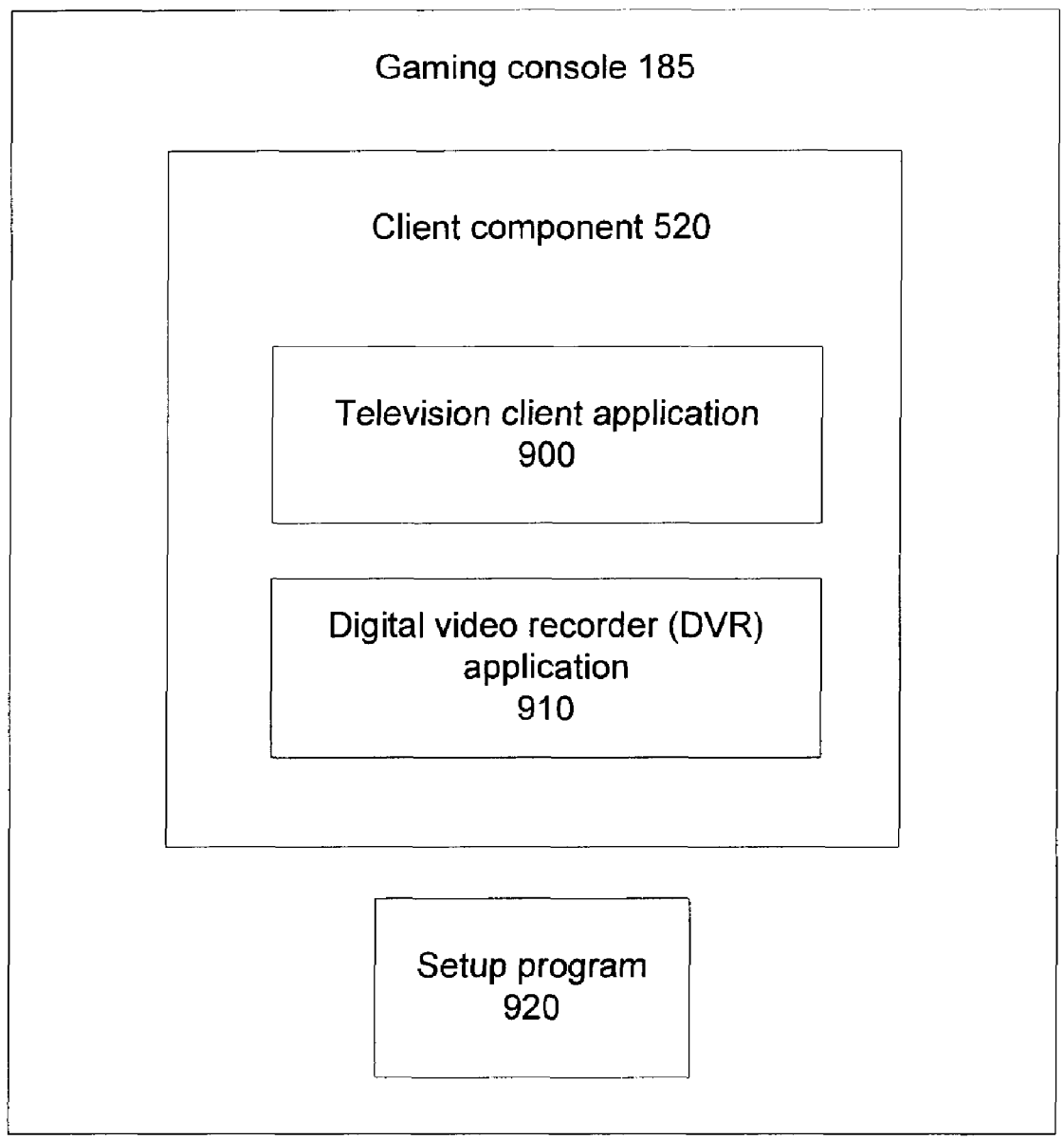
FIG. 9 illustrates that the client component can comprise of two applications: a television client application, and a digital video recorder (DVR) application.

In another aspect of the present disclosure, as FIG. 9 illustrates that the client component 520 can comprise of two applications: (1) a television (TV) client application 900, and (2) a digital video recorder (DVR) application 910. The TV client application 900 is the application that may allow users to watch live TV and video one demand (VOD). The DVR application 910 is the application that may allow users to perform background DVR—recording television while the user is playing a game, for example (alternatively, television can also be recorded when users are not playing games). Additionally, in some aspects of the presently disclosed subject matter, the television client application 900 and the DVR application 910 are separated because in order to run background DVR, the DVR application 910 runs separately in a system thread. Running the TV application 900 application in the system thread might present enormous overhead and unnecessary system costs.

The client component 520 can be initially downloaded from a telecommunications server (if it is not already factory-installed on the gaming console) by the aforementioned bootstrap application 510 (see FIGS. 5 and 6). The gaming console 185 can be responsible for going to the correct server and downloading the client component 520. For instance, the console can know where to download the client component 520 from by using a URL burned into the gaming console flash memory by a setup program 920.

The setup program 920, in turn, can be an interfacing application between a service provider (not shown) and the end customer using the console 185, and it can control the initial experience for the client component 520. For example, the program 920 can walk users/customers through an online gaming account sign-up process, the partitioning of HDD content (more on this aspect below, but generally, if an HDD drive is present on a gaming console, the setup program 920 may walk users through an HDD partitioning application), and GUID provisioning (if applicable). Underneath user experience, the program 920 can also perform the following tasks: write the synchronization server URL into the console flash; write the telecommunications company (or, alternatively, service providers) support number in the console flash; and/or install service provider-specific logo onto the HDD (if available). It can also write the name of the service provider in the flash.

Regarding the online gaming account, if users don't already have such an account, they might be asked to sign up for one on the spot. The setup program 920 may either contain the online account application or it may launch the application from flash memory. The sign-up application can title reboot back to the setup program 920 in order to prevent setup interruption.

Moreover, regarding the GUID provisioning aspect, user interaction may be used to provision a gaming console as a set-top box, i.e., if users are required to phone the telecommunications company to provide a GUID, a serial number, or a console ID—the setup program 920 may direct users to do so. The setup program 920 may be able to read all of the values from a console (as is shown in some Figs. disclosed herein). However, in a one exemplary aspect of the present disclosure, a provisioning application takes a GUID of the set-top box and sends this GUID up to a server on the telecommunications company backend, which automatically provisions the gaming console as a set-top box depending on the IP address that the GUID was sent from. Thus, what may happen is that a user signs up to their DSL router which automatically can associate the IP address to that account for that session. The IP address for that session is then bound to the GUID that is sent up to the service.

It should be noted that the setup program 920 can be designed for global use. Customizations can be made via use of XML and image (e.g. .jpg) files. This can be used to minimize the amount of code that needs to be changed for each individual service provider.

Figure 10:
FIG. 10 illustrates a generic television button.
Figure 11:
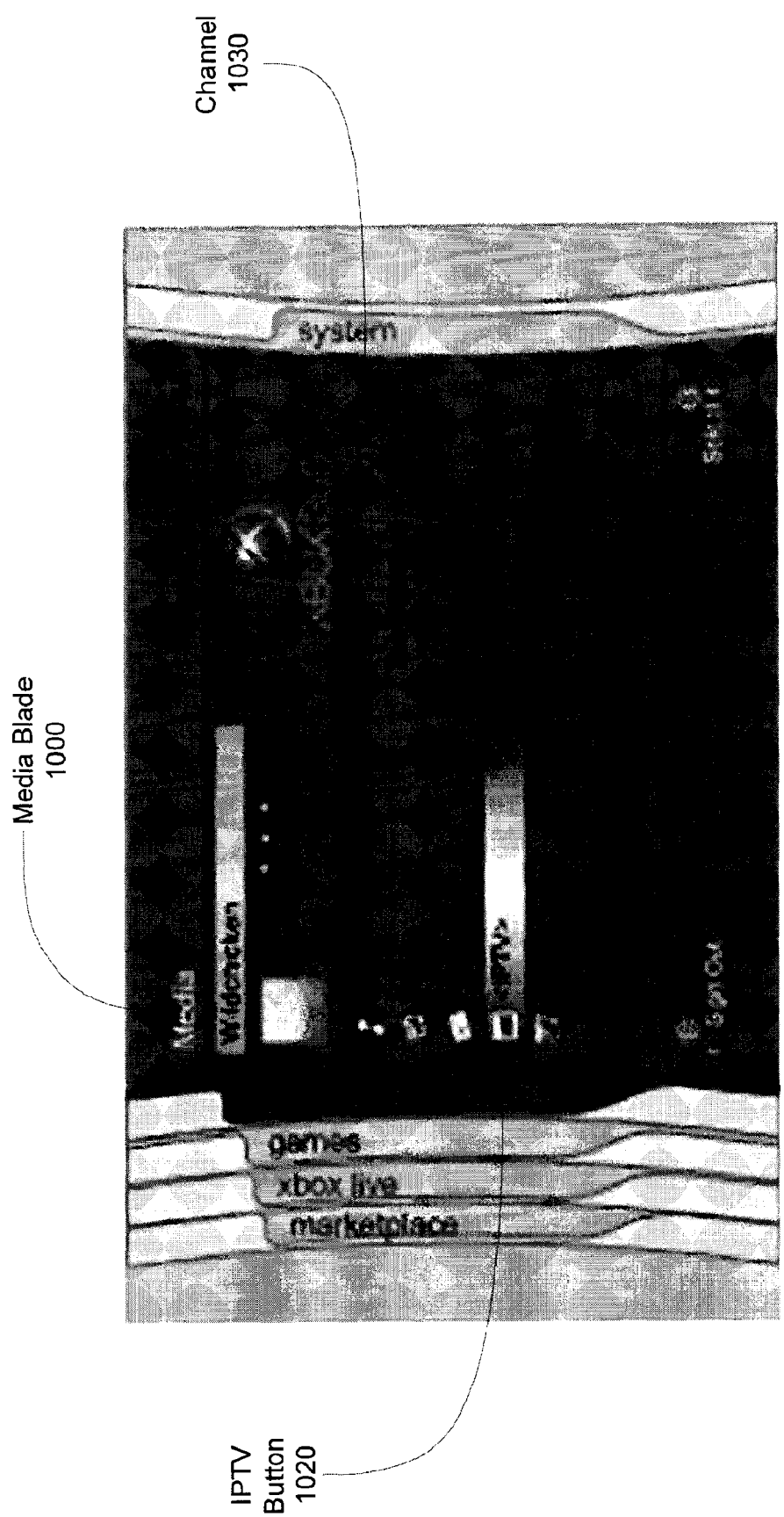
FIG. 11 illustrates an IPTV button.
Figure 12:
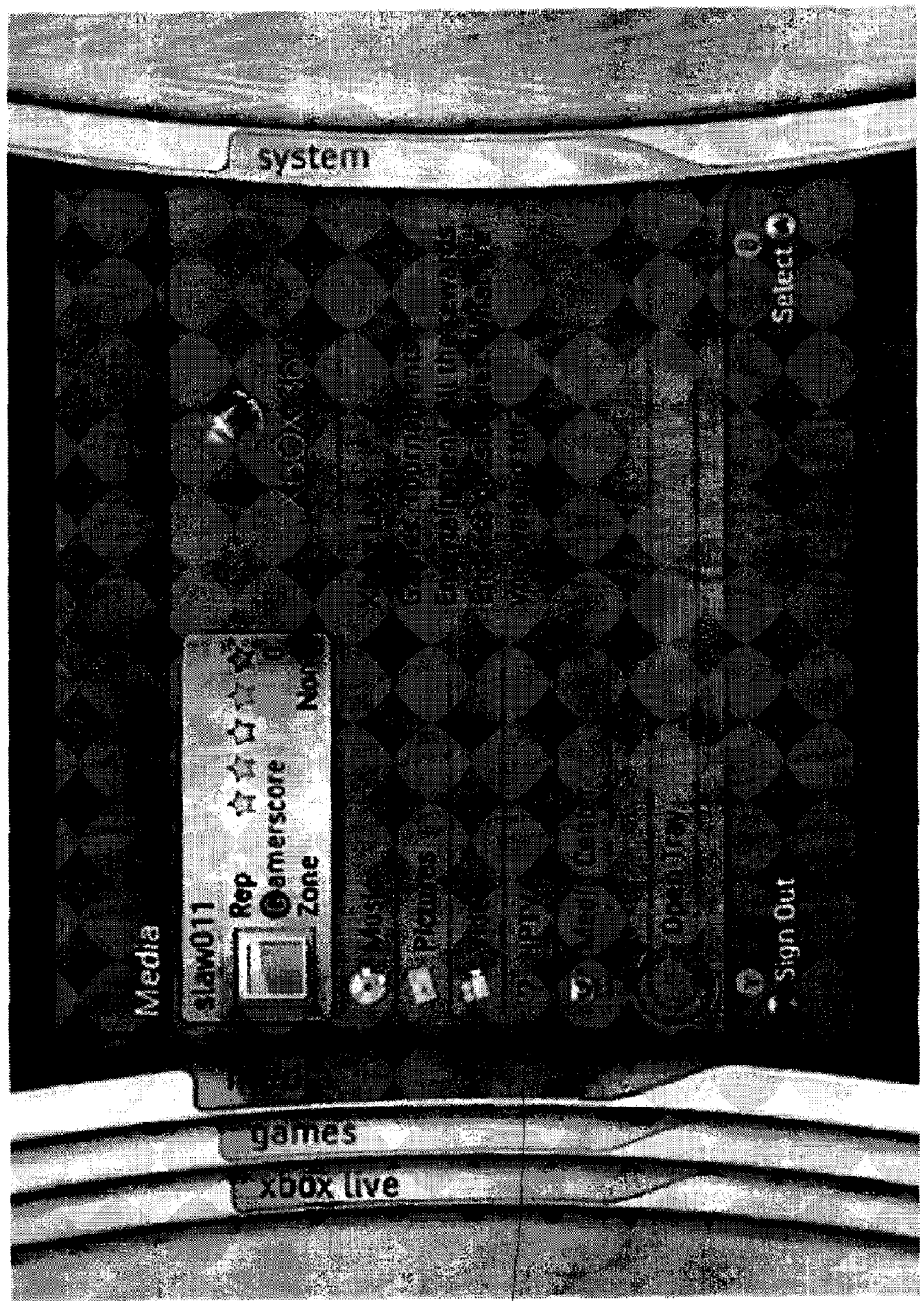
FIG. 12 illustrates a lack-of-available television button.

When the server URL is detected in the console flash, a media blade/menu 1000 can automatically reveal a television button such as the one shown in FIG. 10, namely, a generic television button 1010, or such as the one shown in FIG. 11, an IPTV button 1020. Additionally, various channel option 1030 can be shown, such as the channel numbers, names, and types. In the latter figure, FIG. 11, an IPTV button 1020 can appear above the Media Center button, and the logo displayed next to it can be a telecommunications company branded logo that can be found on the HDD. If the console does not have an HDD attached, the media blade 1010 code can look for a logo on the IPTV server by accessing the URL on the flash settings. If the console is not connected to the Internet and no HDD is present, a telecommunications logo may not be available to the media blade 1000 and no logo will be shown (or, alternatively, a no available button 1040 may be shown as embodied in a question mark "?", as is shown in FIG. 12).

In another aspect of the present disclosure, as was indicated above, when one of the buttons 1010, 1020 is selected, the aforementioned bootstrap application 510 (whether part of the setup program 920 or not) can be automatically activated. If the client component 520 does not exist or if there is no HDD attached to the console, the bootstrap application 510 may go to a telecommunications company's server URL contained in the flash settings to download what is needed to the client. The download matrix that the bootstrap application can use to determine what to download may be set out as follows:

|  | HDD Attached | No HDD Attached |
| --- | --- | --- |
| TV Application | Yes | Yes |
| DVR Application | Yes | No |

Finally, as explained above, in the case of there not being an HDD attached to the console, the bootstrap application 510 can cache the client component 520 into memory and run it from there. The DVR application (discussed with reference to FIG. 9) can be discarded. But, in some aspects, in the case where an HDD is attached to the console, the bootstrap application 510 can always download both the TV application 900 and the DVR application 910 to the HDD.

Regarding the logos discussed with reference to FIGS. 10, 11, and 12, although the service provider-branded logo can be installed onto the HDD from a setup program disc, it's possible that telecommunications companies will want to update their logos at some point in the lifetime of the systems embodying the presently disclosed subject matter. A server can provide such a mechanism. Specifically, during the initial download of the client component 520, the bootstrap application 510 can also download any telecommunications company branded logo that may be available. The branded logo(s) that were originally installed by the setup program 920 can be overwritten by the newer logo(s) provided by the server. New logos may also be available from an update web service, but the bootstrap application 510 need not be responsible for downloading them. A bootstrap web service can direct this download if necessary.

If, for any reason, the bootstrap application 510 can not connect to the server, the telecommunications company support number stored in the console flash can be displayed to the user. The bootstrap application 510 can continue to try to connect to the service at regular intervals until the user exits the relevant console blade/application.

Figure 13:
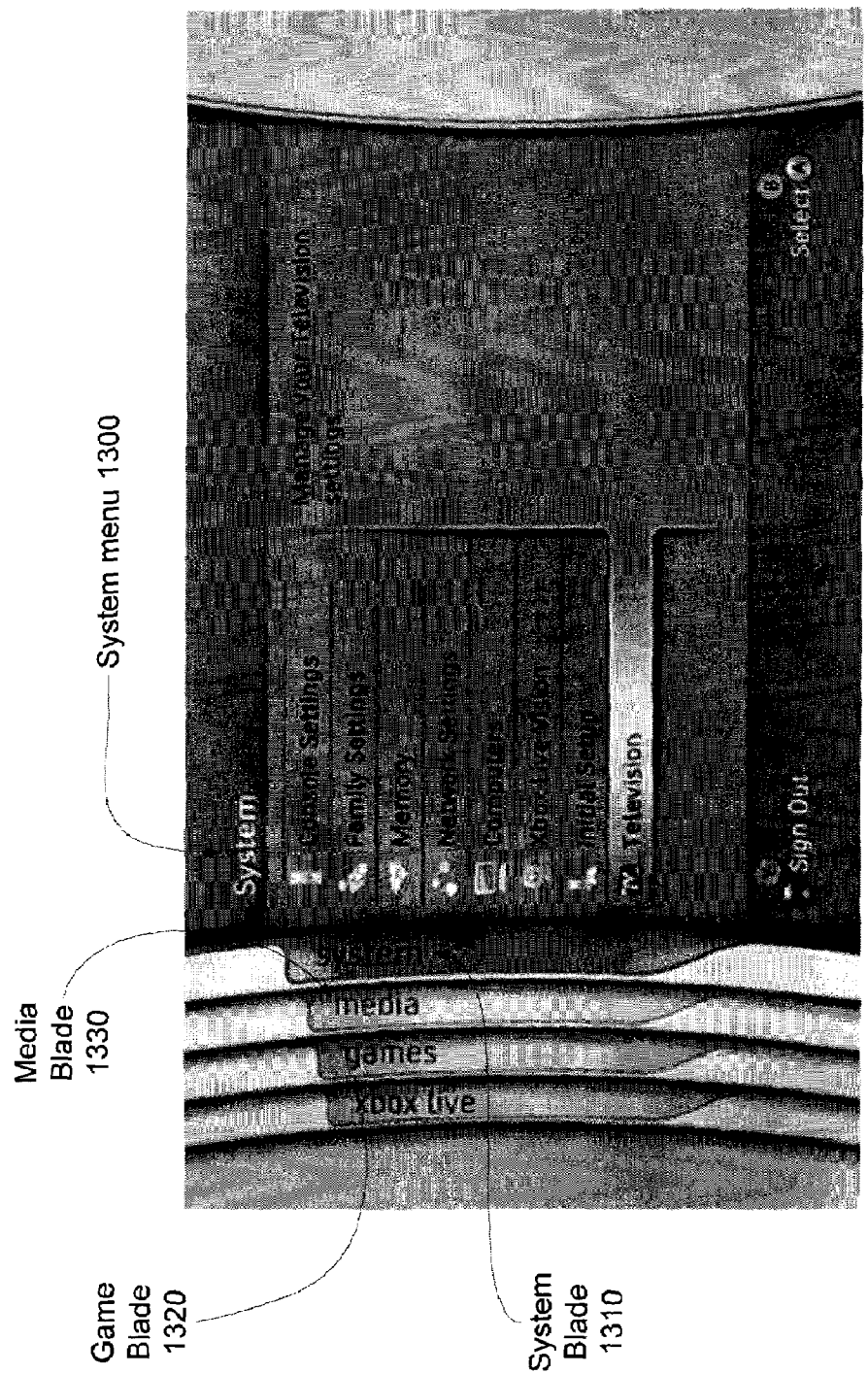
FIG. 13 illustrates a "System" menu (residing on a "system" blade) for managing television settings.

Next, turning to FIG. 13, this figure illustrates a "System" menu 1300 (residing on a "system" blade 1310) for managing television settings, which may be selected from a plurality of blades, including "media" 1320 blade and a "games" blade 1330 shown herein and in some of the previous figures. In FIG. 13, a "system" blade 1310 allows for the management of television settings (via the eighth button in the screen shot), which is to be distinguished from the console settings (first button), family settings (second button), memory (third button), network settings (fourth button), computers (fifth button), Xbox live vision (sixth button), and the initial setup (seventh) button. It should be noted that these shown buttons are merely exemplary and non-limiting. For example, the sixth button, "Xbox Live Vision", could just as easily be substituted for other online subscription service buttons (and their corresponding services).

Figure 14:
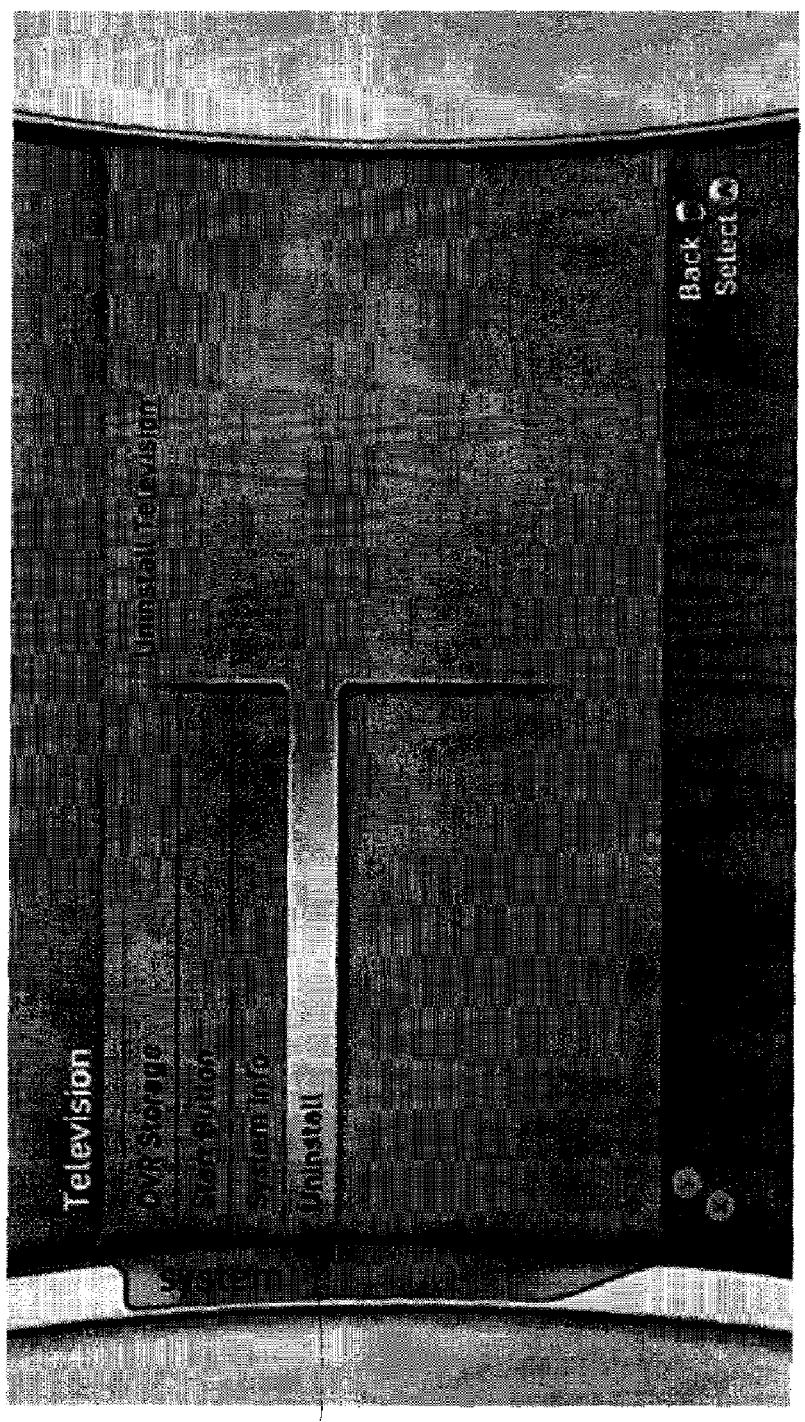
FIG. 14 illustrates that various functionalities can be performed on a gaming console, including but are not limited to, DVR storage, settings, system info, and uninstalling of the television option.

Once the television button (eighth button) is selected in FIG. 13, as FIG. 14 illustrates, various functionalities can be performed on a gaming console. These functionalities include, but are not limited to, DVR Storage (first button), Start Button settings (second button), System Info (third button), and uninstalling of the television option (fourth button). Thus, if a user, looking at a screen showing FIG. 13, pushes the "Select A" button on the bottom right-hand corner of the FIG. 13 screen shot, the next screen that may appear is FIG. 14. (It should be noted that the first option, "DVR Storage", is discussed in more detail below, in the section that discusses DVR aspects of the present disclosure); the second option, "Start button" is discussed in more detail with reference to FIG. 15, directly below; and, the third option, "System Info" was discussed in detail with reference to FIG. 8).

In FIG. 14, the fourth button, "Uninstall" 1400 allows for a gaming console to be de-provisioned (in contrast to the provisioning process discussed above with reference to FIGS. 5-7). This can occur when a user decides to select this button and then (optionally) call a telecommunications company to cancel his or her account or to remove the gaming console from the account. When this is done, the company can update the user's account policy information to reflect the subscription state. The SMS subsystem (discussed below with reference to FIG. 16) may still be able to recognize an IPTV GUID, but it may also realize that the user in question is unsubscribed and will no longer allow access to the IPTV service.

The client component (see FIGS. 5, 6, and/or 7) can be uninstalled by deleting it from the system info area of the "System Blade" (see FIG. 14). When the client component is deleted, the synchronization server URL can be deleted from the console flash and the corresponding TV (e.g. IPTV) buttons will disappear from the "Media Blade" (see FIGS. 10, 11, and 12). The HDD space can then be reallocated for other gaming console applications. In order to re-activate TV capabilities (such as IPTV), the user may have to run the setup program again, re-provisioning the gaming console as a computing device with the additional capability of a set-top box. Additionally, this re-provisioning may entail the telecommunications company having to release their device GUID from a blacklist. Furthermore, and optionally, in another aspect of the present disclosures, some telecommunications companies may want to have the option to disable the un-installation of any client components or other related applications from any rented or leased computing devices acting as set-top boxes.

Figure 15:
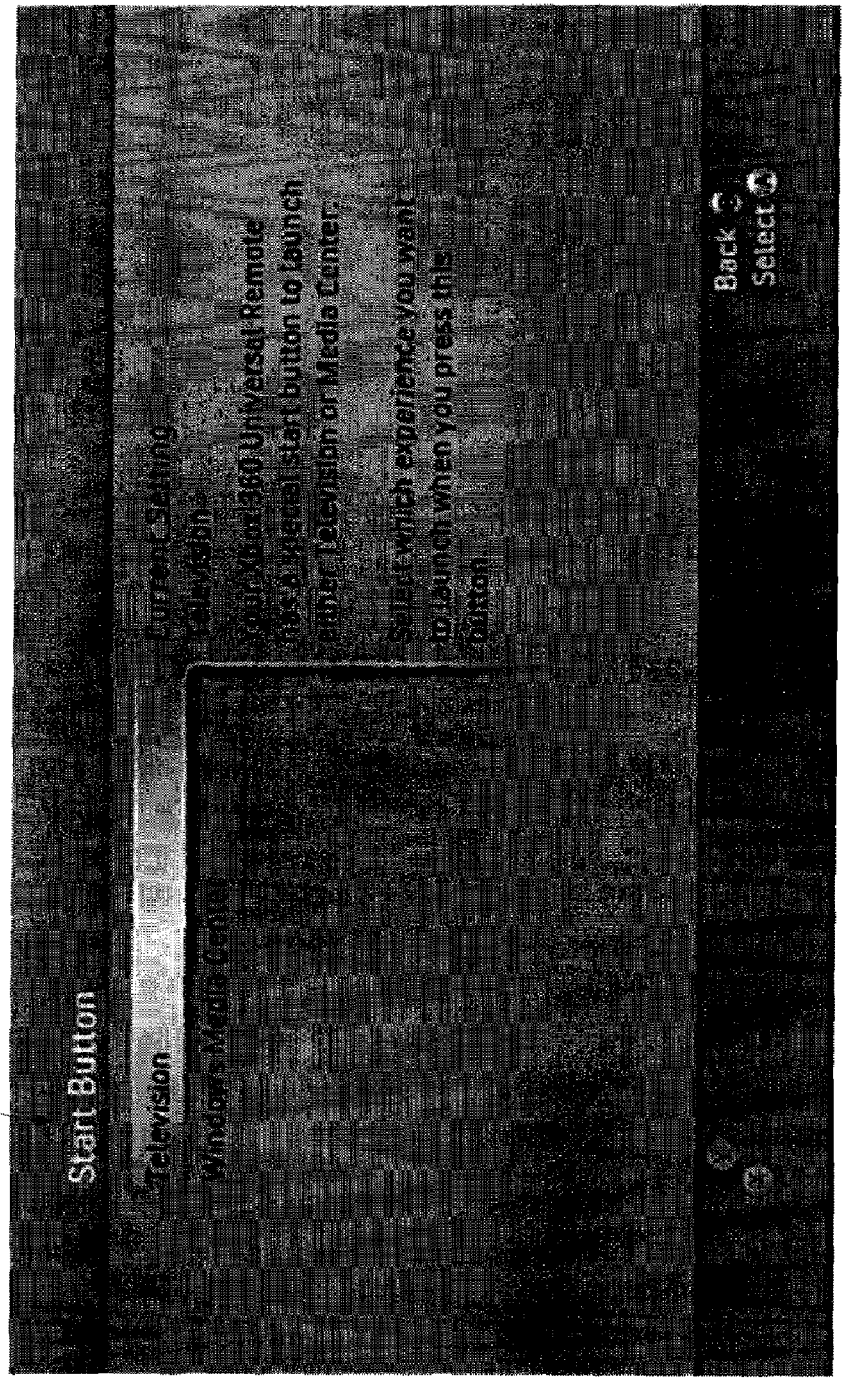
FIG. 15 illustrates a television settings menu.

In any event, in the "system" blade of FIG. 14, in addition to having an "Uninstall" button, it can also have a "Start Button," and FIG. 15 is one possible result of selecting this "Start Button" with the "Select A" option on the bottom right-hand side of the screen shot of FIG. 14. Selecting the "Start Button" takes the user to the "Start Button" menu 1500. This menu 1500 may allow a user to examination of the current television settings and to actually start the television option on a gaming console.

Figure 16:

If this "Start" option is selected, in another aspect of the presently disclosed subject matter, FIG. 16 illustrates the manner in which a client component 1600 can be authenticated and signed-in. The client component can send authentication/sign-in information to the bootstrap service 1610.

Any relevant information can be sent back to the client component 1600. Then, back on the client component end, the client 1600 can now authenticate any relevant servers. The client can attempt to log on to a service (e.g. an IPTV service) by sending its request and relevant information to the bootstrap web service 1610. Then, on the bootstrap web service 1610 end, the bootstrap web service 1610 can perform predetermined checks. After this check, it can query the subscriber management subsystem (SMS) 1620 to see if the client 1600 is already signed in via another IP address. It can also query for other information related to the subscriber. Then, the SMS 1620 can return the information back to the bootstrap web service 1610. And, finally, since everything checks out, the bootstrap web service 1610 can return a list of services to the client component 1600 that the client 1600 is entitled to. The bootstrap web service 1610 and the SMS 1620 can all be subsystem members of some television service (e.g. IPTV service). The bootstrap web service 1610 can also check the client 1600 for updated software versions. If it detects that a software upgrade is necessary, it will automatically update the client 1600.

Figure 17:
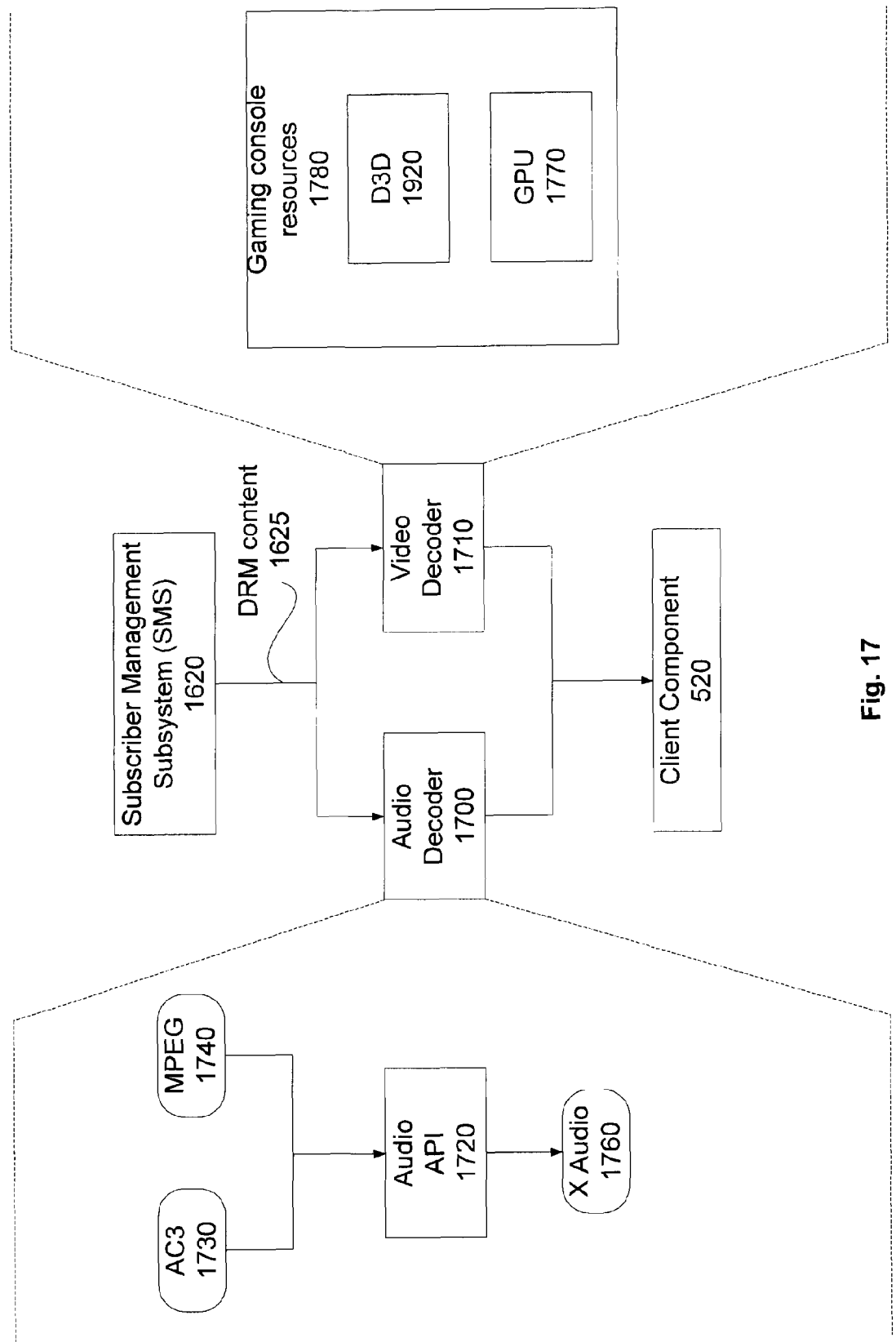
FIG. 17 illustrates one architectural aspect of the present disclosure that shows how audio and video data is processed by a gaming console.

In another aspect of the present disclosure, once TV and/or DVR applications have been provisioned, TV content can be displayed and/or recorded using a gaming console. FIG. 17 illustrates one architectural aspect of the present disclosure that shows how audio and video data is processed by a gaming console. The SMS 1620 discussed above (or any subscriber system, for that matter) can provide DRM content 1625 to a gaming console. This gaming console can have an audio decoder 1700 and a video decoder 1710 (it should be noted that these decoders may be embodied as audio decoder 132 and video decoder 114 in FIG. 30). The audio and video data, once processed by the decoders 1700, 1710 can then be passed down to the client component 520.

The audio decoder 1700 can comprise of an audio API module 1720. This module 1720 can be configured to receive just about any codec, such as AC3 1730 or MPEG 1740. The module 1720 can then convert any such inputted codec into its native gaming codec, such as Xaudio 1760. In other words, if television signals (audio) are arriving in one type of codec, the gaming console can use these signals and convert them to a gaming codec to make out the audio signal.

Figure 19:
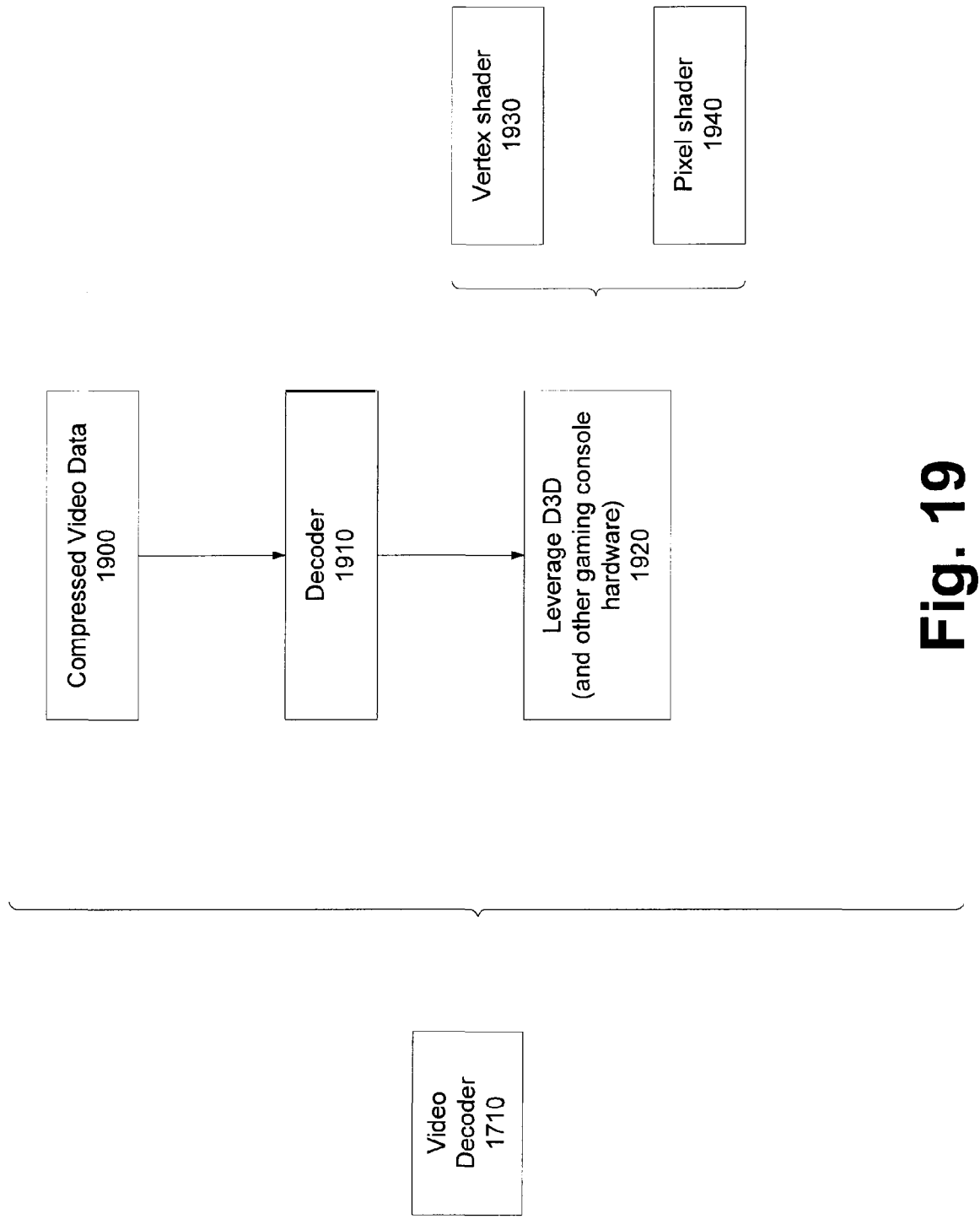
FIG. 19 shows how the gaming console processes video data.

The video decoder 1710 also uses various resources to decode DRM content 1625, and it eventually provides the content 1625 to the client component 520. FIG. 19 presents in more detail the type of resources the gaming console uses in the video context, but by way of example and not limitation, these resources include D3D (defined below) 1920 and GPU 1170 resources. In this way, the gaming console uses its native gaming resources, whether decoders, GPUs, D3Ds to display television signals (sound and video).

Figure 18:
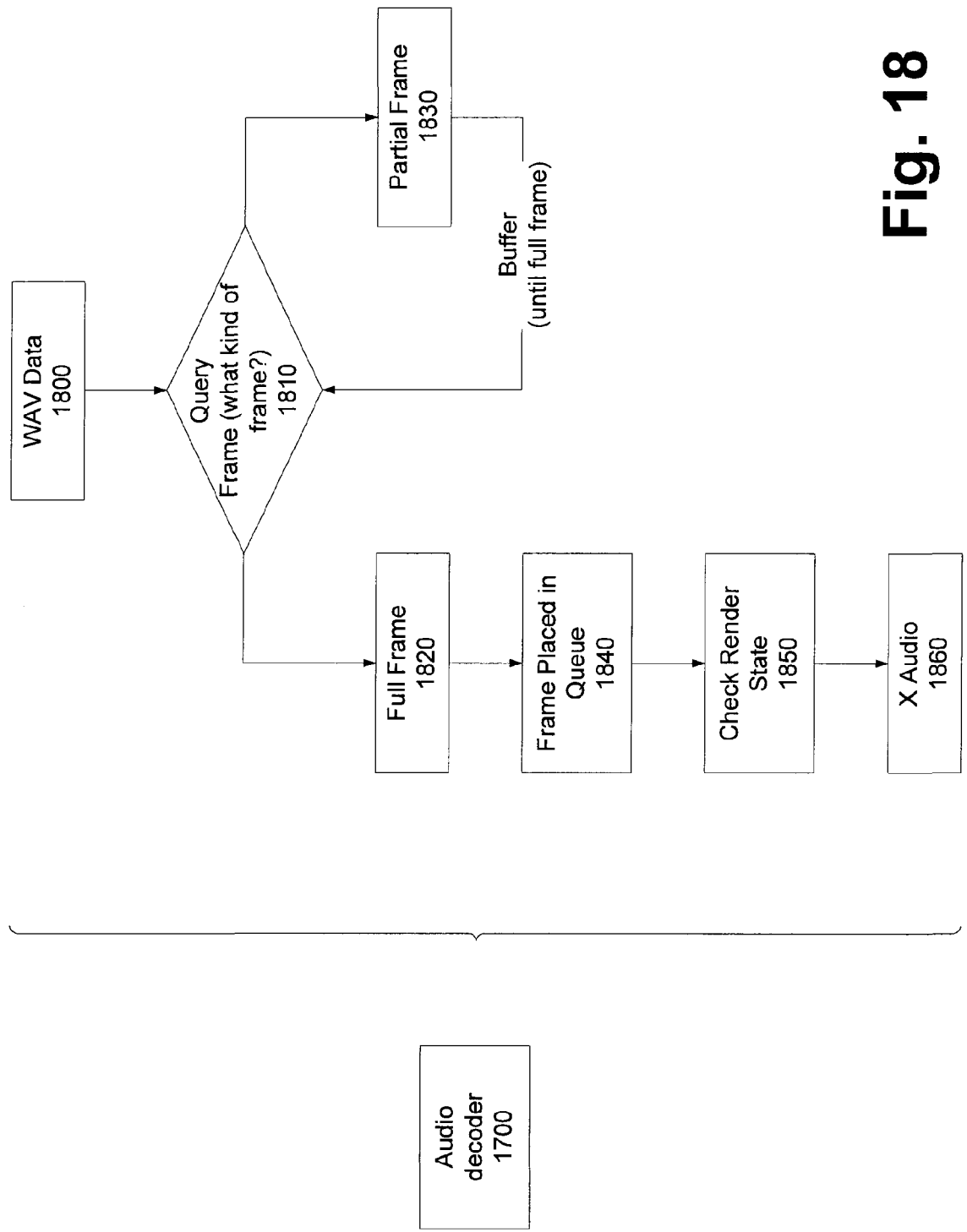
FIG. 18 explains in more detail the audio decoder that was mentioned with reference to FIG. 17.

Next, FIG. 18 explains in more detail the audio decoder 1700 that was mentioned with reference to FIG. 17. This decoder 1700 can receive, for example, some sort of .wav data file 1800 and it can query 1810 this data (or data packet(s)) whether the data received is a full frame or not. If not, i.e. if a partial frame is received 1830, this frame can be buffered until a full frame can be constructed. If a full frame 1820 is received, this frame can be placed in a queue 1840, and the render state can be checked 1850 to see if an Xaudio 1860 data can be rendered. If so, this data 1860 can be used as television sound on the gaming console.

Besides the audio data, the gaming console can also process video data, as is shown in FIG. 19. At box 1900, compressed video data can be received by the gaming console, and then decoded by the decoder 1910. Since the gaming console has powerful hardware resources to process and render data, some of its native resources including Direct3D component(s) can be used in displaying television pictures.

Direct3D (D3D) is part of DirectX API, where those of skill in the art will readily appreciate that DirectX is a collection of APIs for handling tasks related to multimedia, especially game programming, and it is widely used in the development of computer games. D3D can be the base for the graphics APIs on the gaming consoles. It is used to render three dimensional graphics in applications where performance is important. D3D also allows applications to run in full screen mode instead of embedding them in a window (though they can still run in a window if programmed for that feature). D3D can also use hardware acceleration if it is available on the graphic board. For example, vertex shaders 1930 and pixel shaders 1940 can be used to further enhance the picture quality of a television signal. It will be readily appreciated that high definition (digital) signals will appear especially well rendered, given the amount of data to be shown.

Figure 20:
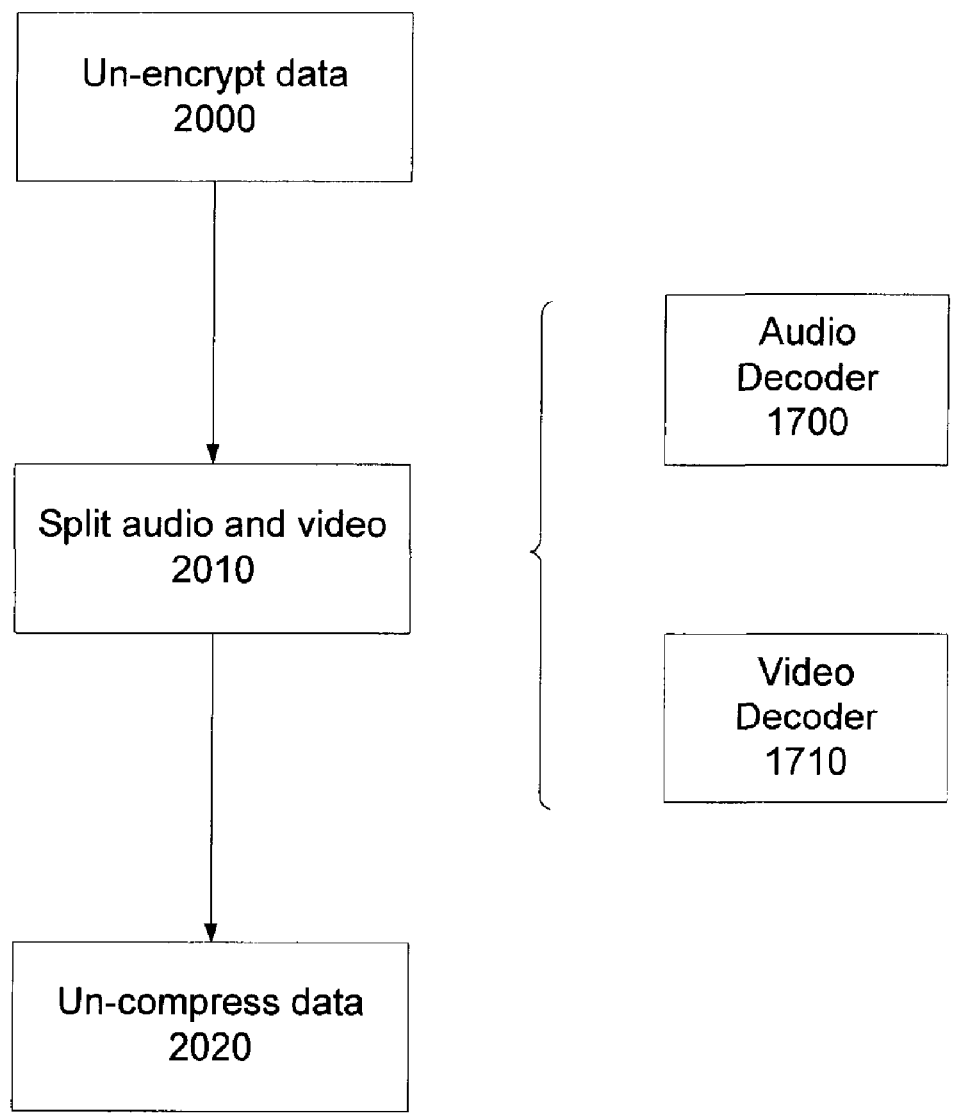
FIG. 20 shows a general flow of events that may occur when a gaming console is used to display television signals.

By way of summary and not limitation, FIG. 20 shows a general flow of events that may occur when a gaming console is used to display television signals. At box 2000, data is first un-encrypted, then it is split into an audio portion (FIG. 18) and a video portion (FIG. 19), using such resources as audio decoders 1700 and video decoders 1710, respectively. Once this is accomplished, the data is uncompressed and eventually transformed into the appropriate codec and then processed to be displayed into sounds and pictures.

II. Recording TV on a Gaming Console

In addition to being displayed, data can also be recorded. The gaming console can record TV signals during the time users are playing games on the gaming console (or using it for other media purposes). In one sense, this is background type recording. Alternatively, in other aspects, TV signals can be recorded either before of after any media use of the console (where media use may include playing games, downloading music, watching DVDs, and so on). Still in other aspects, data may be recorded during a particular media use (foreground recording). For instance, a user may be recording a game he or she is playing, or recording a TV show he or she is watching. Various different aspects of the presently disclosed subject matter can include the recording of data using the DVR mechanism.

Figure 21:
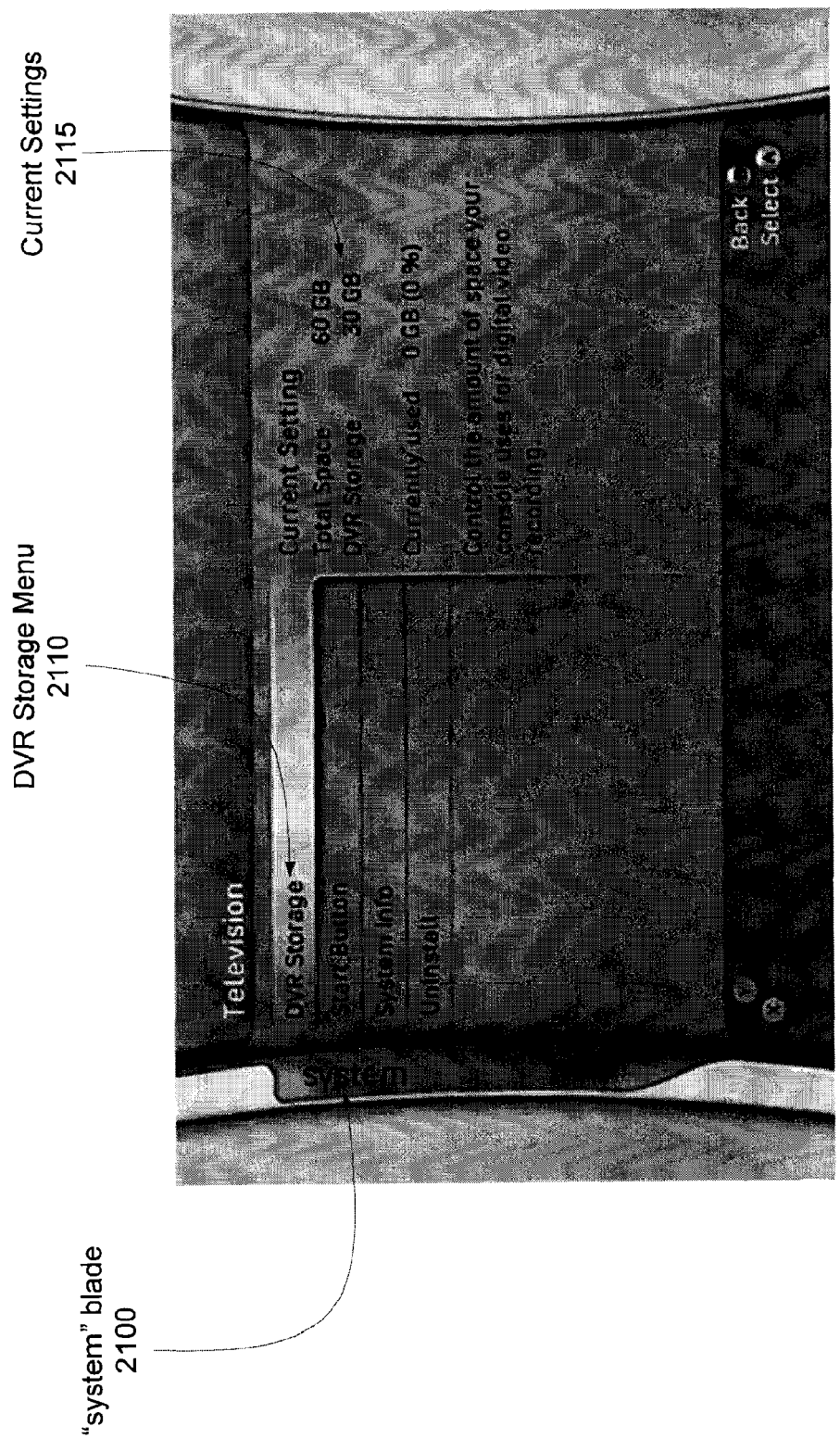
FIG. 21 illustrates one possible implementation of an aspect of the present disclosure, where users can select to set DVR storage settings.

FIG. 21 illustrates one possible implementation of an aspect of the present disclosure, where users can select to set DVR storage settings. A "system" blade 2100 presents to the user a "DVR Storage" button 2110 (cf. FIG. 14 where users can select the "Uninstall" button 1400). This button 2100 may have with it associated information, such as the current settings 2115. FIG. 21 shows that the total space on the gaming console is 60 GB, and that 30 GB of that total is dedicated to DVR storage. By selecting this button 2110 by pressing "A" on the bottom right hand corner of the screen shot, the gaming dashboard takes the user to the screen shot shown in FIG. 22.

Figure 22:
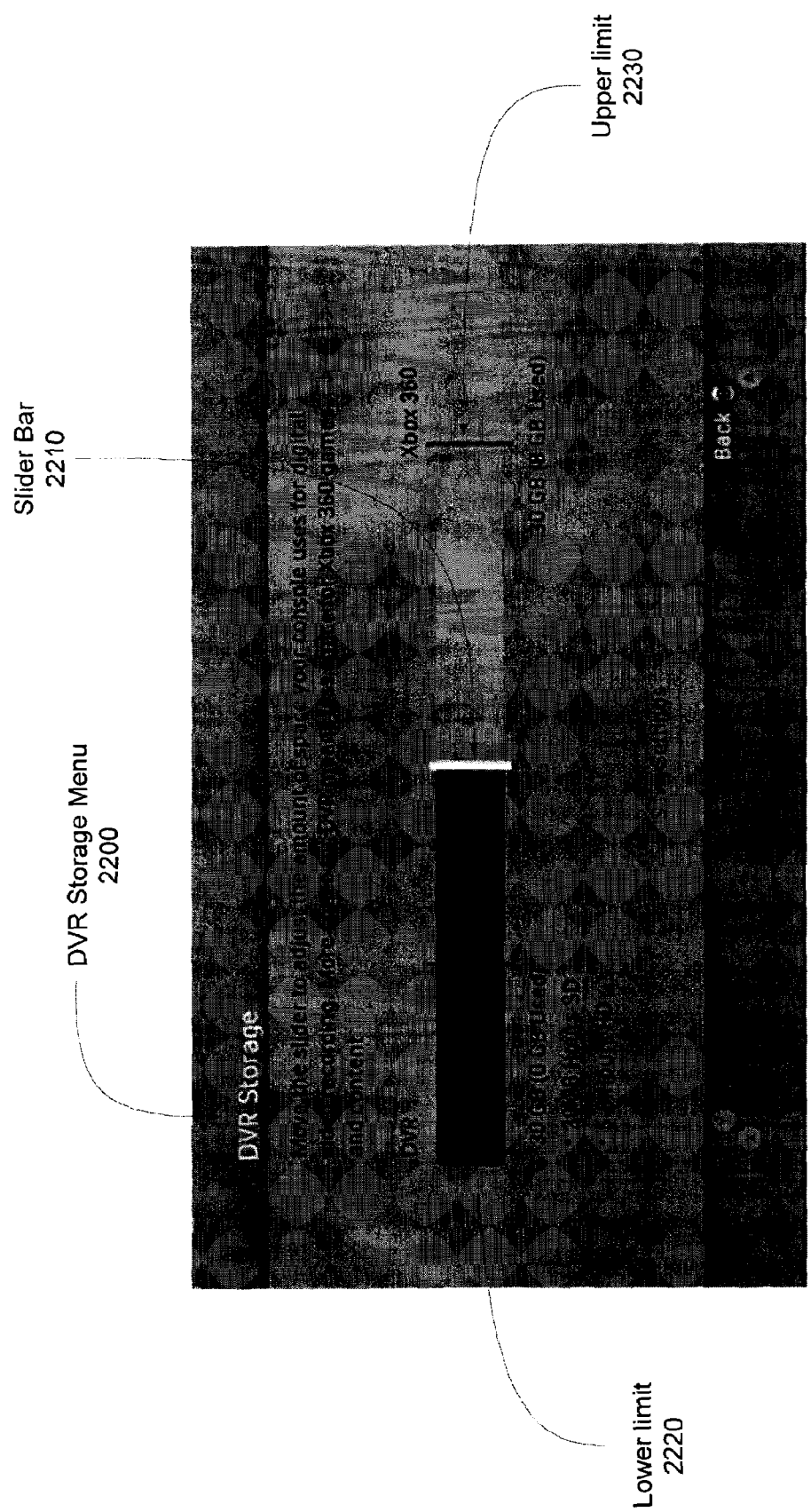
FIG. 22 shows a DVR storage menu that allows users to move a slider to adjust the amount of space a console uses for DVR use.

Specifically, FIG. 22 shows a DVR storage menu 2220 that allows users to move a slider to adjust the amount of space a console uses for DVR use. As the menu 2220 explains, more space for DVR means less space for the gaming console games and content (such as saved games, music storage, etc.). In FIG. 22, a slider bar 2210 can be a means to adjust the storage space allocated for DVR use. However, it should be noted that this adjustment, in one aspect of the present disclosure, may be controlled by a lower limit 2220 and an upper limit 2230. Thus, the slider bar 2210 can move in between these two limits 2220, 2230. This means that there may be a minimum amount of set storage space for DVR uses (anything to the left of the lower limit 2220 bar) and a minimum amount of set storage space for system and other uses (anything to the right of the upper limit 2230 bar). This ensures that the console as a whole functions properly, namely, allowing at least some DVR and reserving some space for system uses (such as gamer tags, saved games, etc.), respectively.

Figure 23:
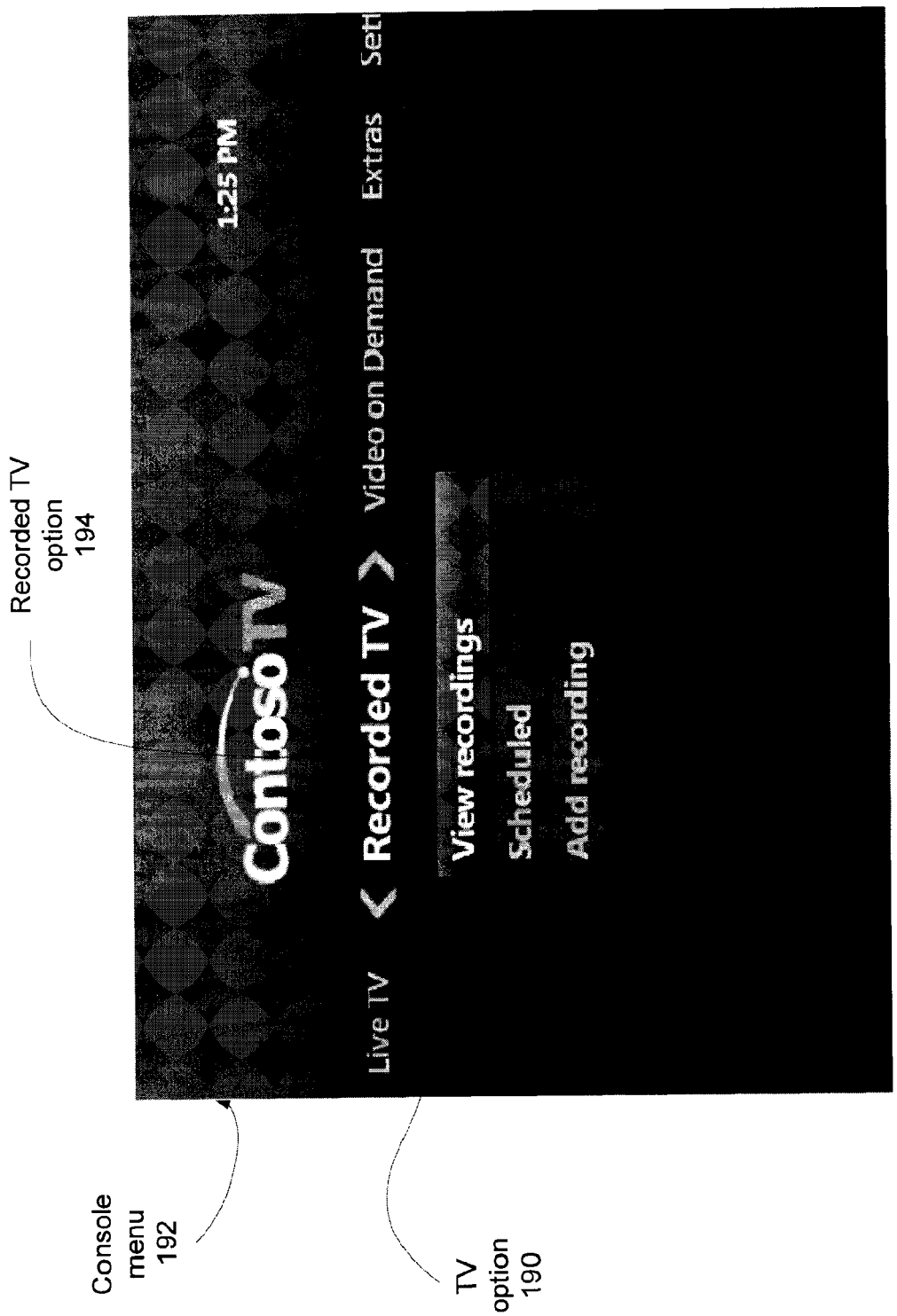
FIG. 23 illustrates what happens when a user selects the DVR option when the client component is running on the gaming console.

Next, FIG. 23 illustrates what happens when a user selects the DVR option when the client component is running on the gaming console. In contrast to FIG. 3, which illustrates a selection of the "Live TV" option 190, FIG. 23 illustrates the selection of the recorded TV option 194. This option may have various menu details, including but not to: viewing recordings, scheduling recordings, and adding recordings. Any recoding functionality that is used for a typical DVR device can be used herein on the gaming console.

Figure 24:
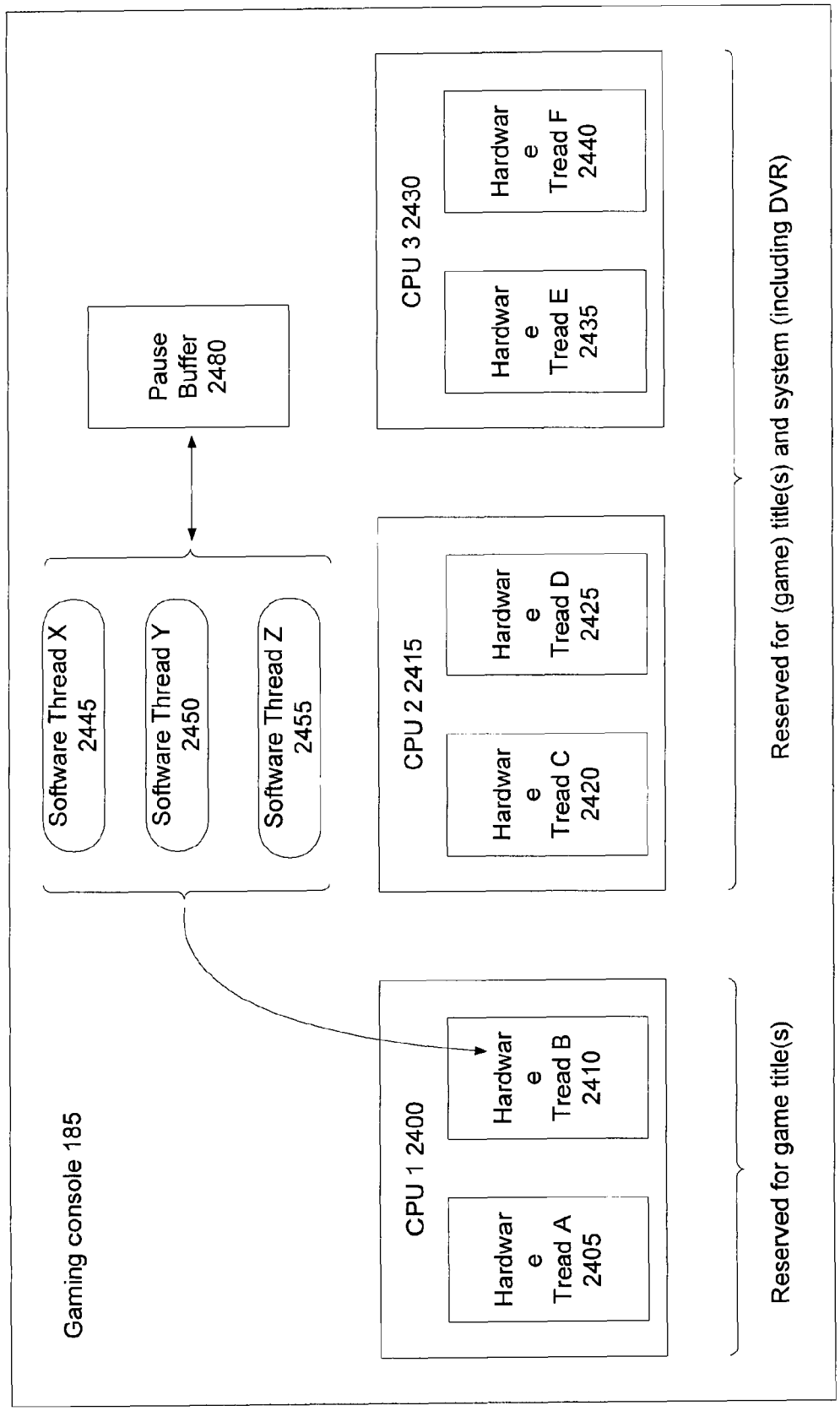
FIG. 24 illustrates architectural aspects of the present disclosure, including the interoperability of central processing units (CPUs) and hardware and software threads.

In order to provide DVR functionalities on a gaming console, the client component and/or other modules may manipulate console hardware and software in various ways. Since the primary purpose of a gaming console is typically to play games, when other media are running on the gaming console, certain assurances should be taken into consideration regarding the preservation of quality of gaming experience (while allowing such additional media, including DVR, to execute). FIG. 24, thus, ensures that hardware threads are reserved for the appropriate gaming console media, including game titles and system functionalities, which may include DVR (and TV for that matter—it is understood that the present discussion with respect to DVR may also apply to TV, discussed above, and other related functionalities, such as VOD, DVD play, etc.).

Turning now to FIG. 24, a first central processing unit (CPU) 2400 may have two hardware threads A 2405 and B 2410 resident thereon. Similarly, a second CPU 2415 may have threads C 2420 and D 2425; and, a third CPU 2430 may have threads E 2435 and F 2440. It is also understood, as those of skill in the art will appreciate, that there may be a plurality of software threads that may belong to each hardware thread. For example, hardware thread B 2410 may have associated software thread X 2445, thread Y 2450, and thread Z 2455 (the other hardware threads 2405, 2420, 2425, 2435, 2440 may similarly have multiple software threads). Each of these software threads X 2445, Y 2450, Z 2455 may perform some task, as is explained in more detail below (e.g. playing music, VOD, DVR, etc.).

In this aspect of the presently disclosed subject matter, the first CPU 2400, in other words, the first two hardware threads A 2405 and 2410, may be reserved for the game titles. This reservation ensures that, at least in part, the gaming experience users are used to will be preserved (in spite of other media running on the gaming console 185). The remaining threads, C 2420, D 2425, E 2435, and F 2440, may be reserved for both gaming titles and system mechanisms, such as DVR, music, etc. This, in turn, ensures that system functionalities can run, but that game titles retain a significant portion of computing resources to preserve gaming quality.

Additionally, FIG. 24 shows that a pause buffer 2480 may be used to buffer data for any given application if the user switches temporarily to a different application. For example, in one scenario, a user could be watching TV and then for a few seconds or minutes, switch to playing a game (and then switch back to watching TV). The original TV data from which the user switched could be buffered in the pause buffer 2480. This pause buffer 2480 could, of course, also be used for media (DVR, VOD, games, etc.). It allows for efficient handling of data when users want to switch (temporarily) applications on the gaming console.

Figure 25:
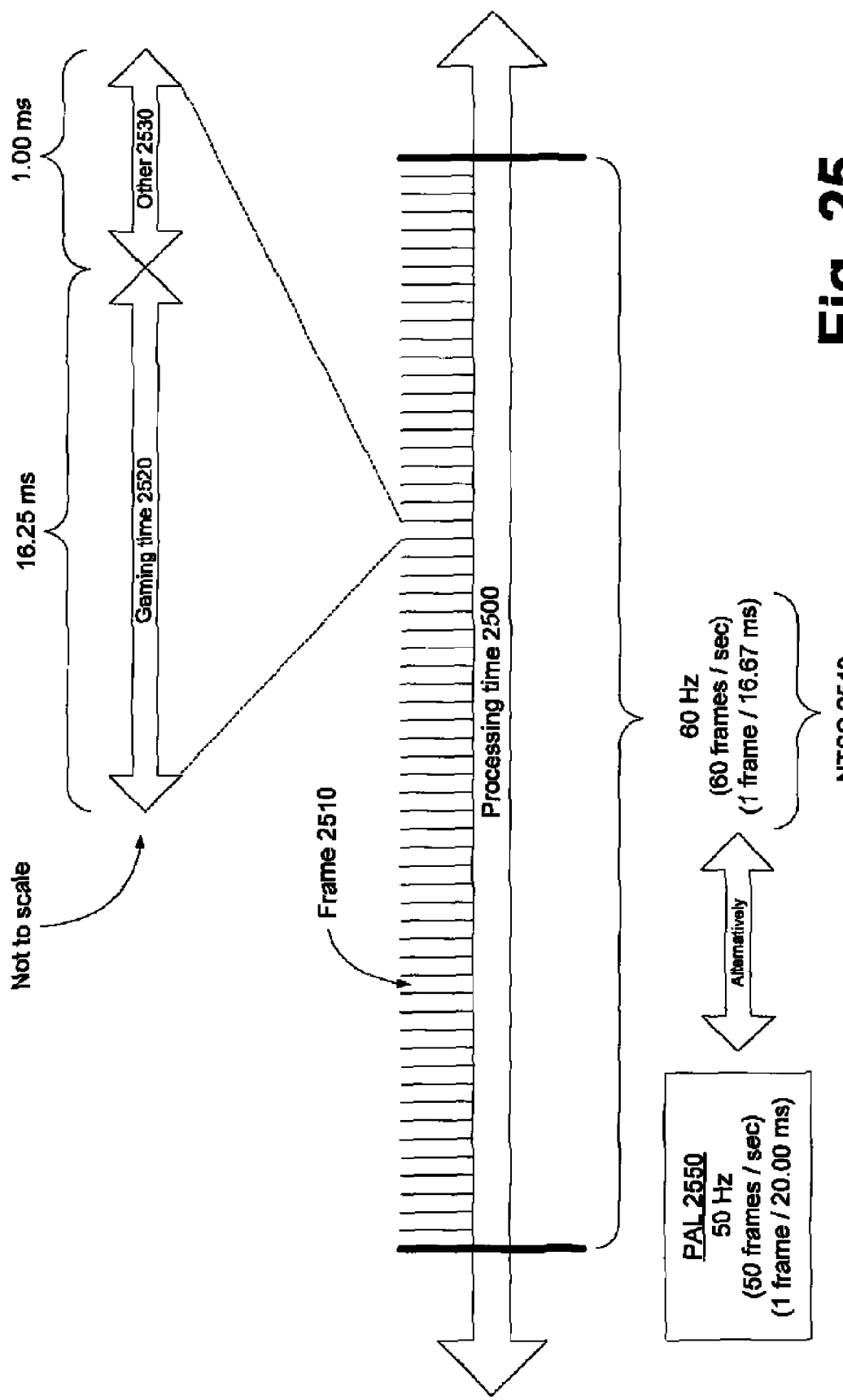
FIG. 25 illustrates how processing time may be allocated using the hardware threads shown in FIG. 24.

In another aspect of the present disclosure, FIG. 25 illustrates how processing time may be allocated using the hardware threads shown in FIG. 24. For example, a one second time slice of processing time 2500 may contain 60 frames 2510 to be rendered by the gaming console. In other words, 60 frames per second are rendered or one frame about every 16.67 ms. As FIG. 25 shows, this would be the case in NTSC scenario, however, alternatively, in the PAL scenario is could be 50 frames per second or 1 frame every 20 ms.

In any case, whatever level of temporal granularity is used (which is merely implementation specific and hence not limiting to the broader disclosure herein), a time slice comprising of, say, 16.25 ms could be allocated to gaming processing 2520, and 1.00 ms could be allocated to other media 2530 activity, such as DVR, music, DVD, user dashboard, and so on. This ratio, of roughly 16-to-1 (although, again, it is merely exemplary and not-limiting), can assure that games on the gaming console are given a preponderance of the computing resources vis-à-vis other media on the gaming console. In this embodiment, the ratio may be 16-to-1, but in others it may be 20-to-1, still in others it may be slightly higher or slightly lower. These heuristics can be applied to correspond to developer/manufacturer expectations and goals.

It should also be noted that these ratio heuristics can be applied uniformly across the various hardware threads 2405, 2410, 2420, 2425, 2435, 2440 discussed with reference to FIG. 24. Alternatively, they may be applied non-uniformly. Still in other aspects, they may dynamically change depending still on other heuristics or various feedback mechanisms that produce optimized computing results.

Figure 26:
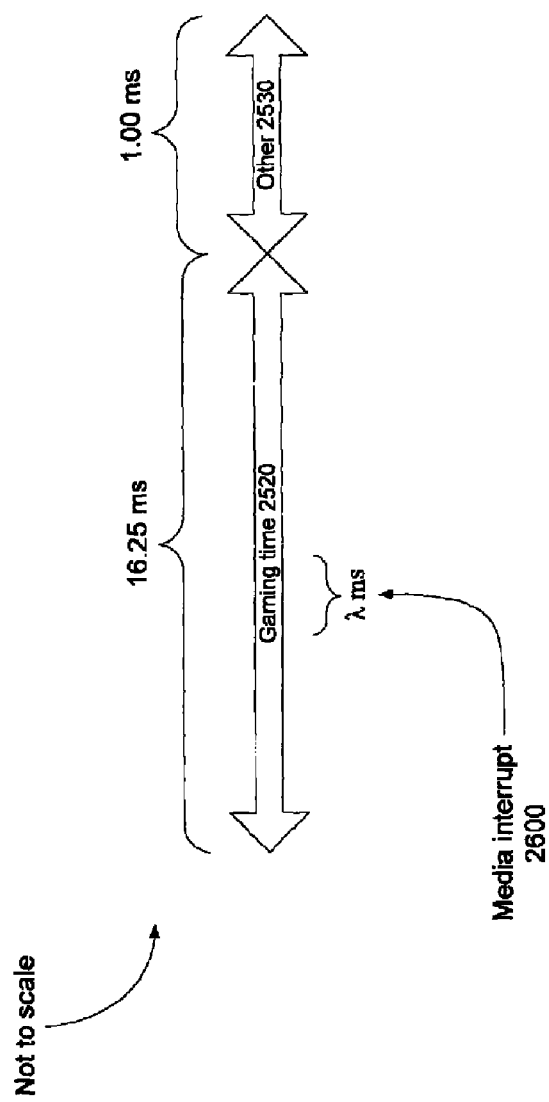
FIG. 26 illustrates that media interrupts may be handled by the gaming console when processing occurs during gaming time.

In another aspect of the present disclosure, FIG. 26 illustrates that media interrupts may be handled by the gaming console when processing occurs during gaming time. One real world example where this might occur is when users are playing games and then press some button related to other media. For example, a user may be playing a game and then decide to record her game using the DVR functionality; or alternatively, a user may be playing a game, and then remember that his favorite show is playing on TV, and thus may decided to record this show without exiting the game (choosing to continue playing the game, and viewing the TV show later after it has been recorded). In another aspect, it could also be the case that a viewer may start viewing the part of the show that has been recording while the DVR is continuing to record the remainder of the show. Thus, the DVR functionality may work in the background not only when users are playing games, but also when users are engaging other media titles.

In such a scenario, when users are playing a game, but want to perhaps record some media content (TV, game, music, etc.), when they press the record button a media interrupt 2600 may be generated and quickly handled so as not to disturb the gaming experience during the gaming time 2520. Thus, the interrupt shown in FIG. 26 may be handled for a short time λ ms, perhaps queued, and then eventually processed after the gaming time 2520, namely, during the 1.00 ms time slice allocated to the other media functionalities.

Figure 27:
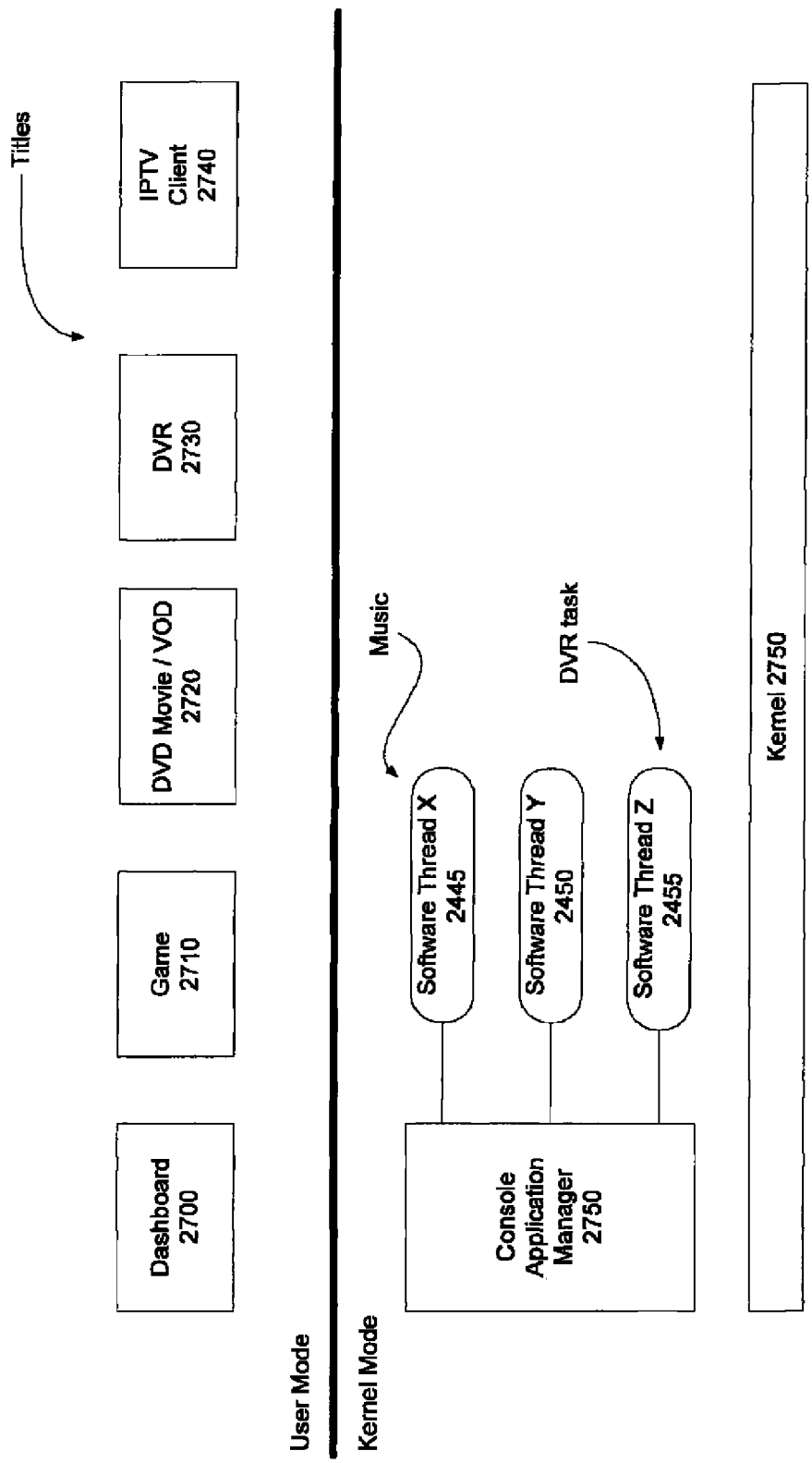
FIG. 27 shows how software threads are handled by an application manager and how titles relate to these threads.

In another aspect of the present disclosure, FIG. 27 shows how software threads are handled by an application manager and how titles relate to these threads. FIG. 27 shows a dashboard title 2700, a game title 2710, a DVD movie title 2720, a DVR title 2730, and an IPTV client 2740. The DVR title 2730, for example, can have a corresponding software thread Z 2455 (originally shown in FIG. 24). This thread 2455 can be managed by a console application manager 2750 and this manager 2750 can schedule this 2455 and other threads 2445, 2450 according to the heuristics discussed with reference to FIG. 25. In short, the manager 2750 residing in the kernel mode of the gaming console can provide resources for applications or titles running in the user mode of the console.

As was mentioned above, the aspects discussed herein with respect to DVR functionalities could just as easily be applied to other media titles. Thus, the discussion of hardware threads, software threads, upper and lower limits, and so on, is contemplated herein as applying to such appropriate media.

III. Integration of Media Resources on a Gaming Console

The integration aspect of the present disclosure has been largely disclosed in the discussion in sections I and II. For example, FIG. 10 shows how music, pictures, video, and TV (and potentially other media) are integrated in a "media" blade 1000. The media blade 1000 may be a user interface that typically appears in the gaming context. However, FIG. 10 shows that it may also contain media that is traditionally not associated with gaming, such as TV or DVR.

In the case of TV, for example, various features can be added to integrate this functionality within the dashboard of a gaming console. For example, a service name (e.g. "AT&T U-Verse" in FIG. 29) can be placed in flash by the setup program. The service name does not have to originate from the network and does not have to be updatable. A service logo can be used that has been acquired from the network or from cache on systems with a HDD. Service text can be used, including text describing the service that has been acquired from the network or from cache on systems with a HDD. This can be displayed to the right of the button when the button has focus. Default text can also accompany the other features, where this text describes TV services in general and it can be displayed when the service text is not available on the network. Support text can also appear (i.e. Call company Y at 800.XXX.XXXX) and it can be placed in flash by the setup program. The support text does not need to originate from the network and does not need to be updatable. A spinner can be employed, where the console spinner logo will be displayed instead of the service logo if the service logo is not available. A warning logo can be displayed instead of the service logo if the network is unavailable. This logo can be a yellow triangle with an exclamation mark in the middle, and so on.

If a TV network is unavailable, a warning logo, service name and support text can be displayed and the TV button will be grayed out but able to receive focus. When the user selects the TV button and presses the "A" button, the gaming console may attempt to launch an executable file. If this file exists, it can start and be responsible for launching the TV client. If the file does not exist, the dash can launch the TV client. If the user is navigating anywhere on the dashboard and presses the TV button on the remote control, the TV experience can start without any confirmation.

Figure 28:
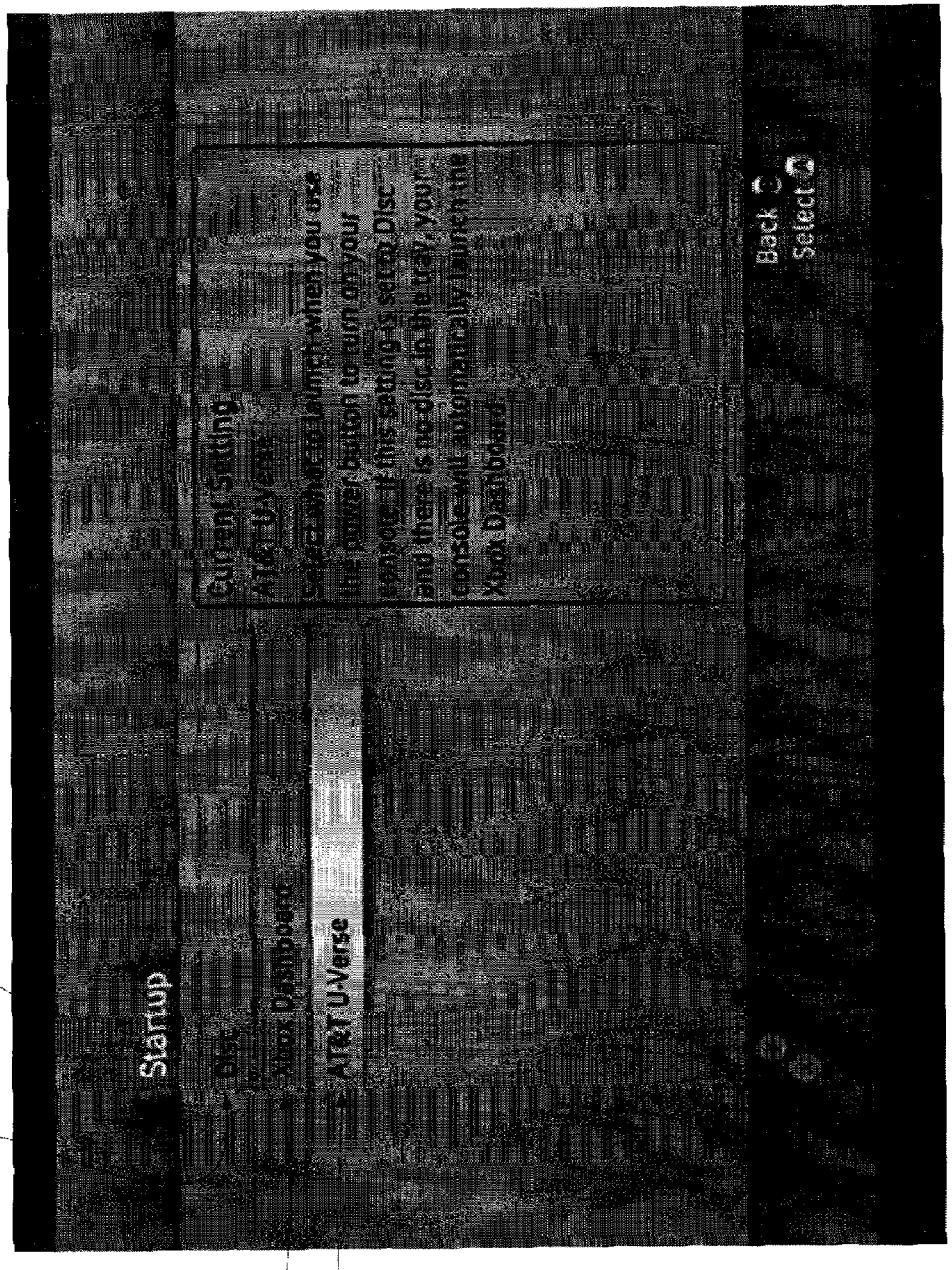
FIG. 28 illustrates that because the gaming console can act not only as a gaming device but also a set-top box, there may be multiple startup options on a given menu.

The term "integration" herein is meant to be broad and inclusive of various aspect of media integration. For example, in another aspect of the present disclosure, FIG. 28 illustrates that because the gaming console can act not only as a gaming device but also a set-top box, there may be multiple startup options on a given menu 2800. When a user first starts a gaming console, this console may be configured to start/boot up as a set-top box, as is shown in the highlighted button 2830. If this option is selected, when the user presses the power button to turn on the console, the console will act as a normal set-top box and TV will be launched. However, any time thereafter, the user may invoke it various other media functionalities, such as being a gaming device, or music device, a DVD device, a DVR device, and so on.

In this aspect of the present disclosure, when the power button is first pressed by a user, alternatively, the gaming console dashboard (or welcome menu or main menu or blade menu) can be launched 2820 instead of TV. Alternatively, if a disc is present in the gaming console, the console can start playing title 2810. In short, the user can customize how the gaming console will behave in its default state.

Figure 29:
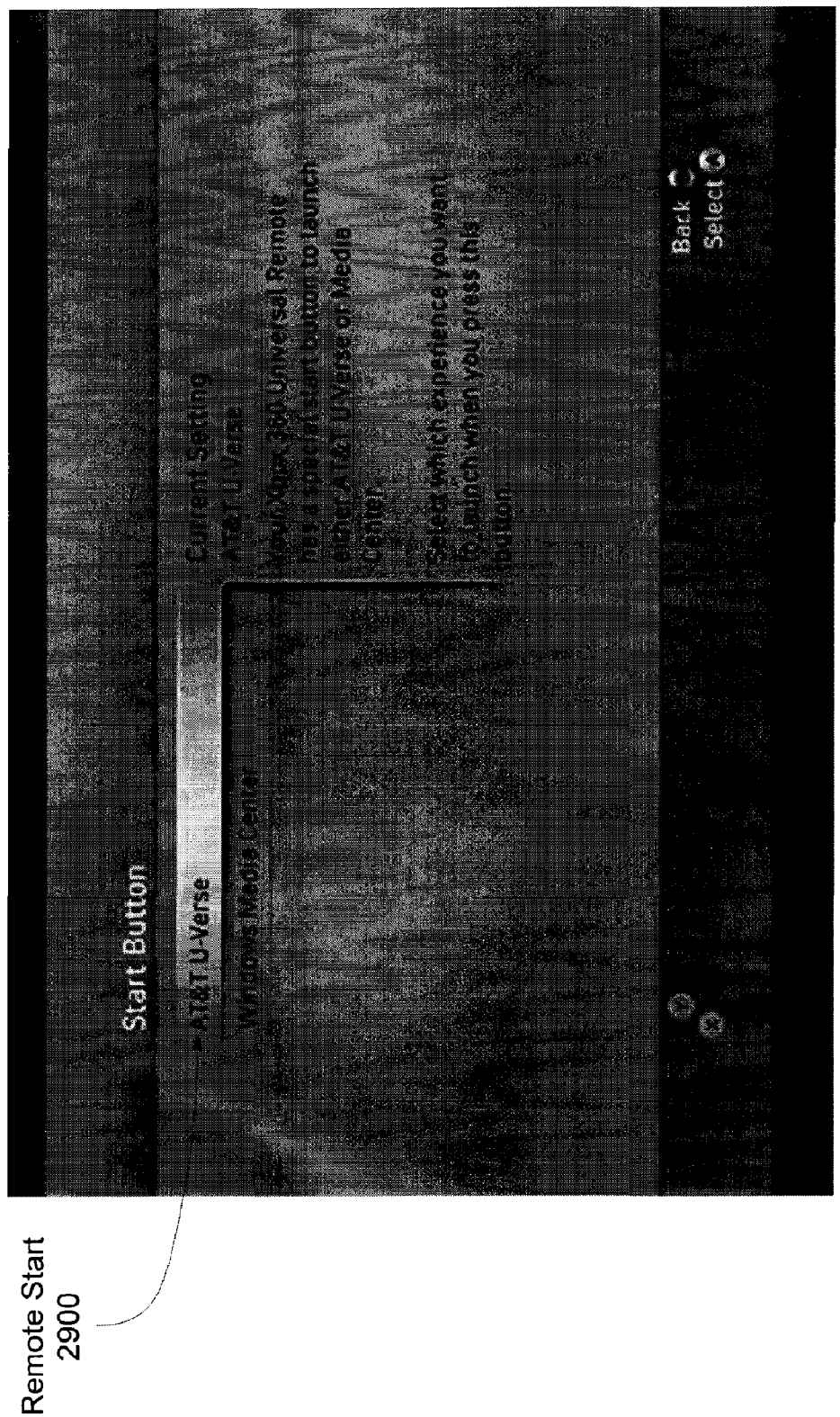
FIG. 29 shows that the gaming console may have a special start button on a remote controlling device to launch either TV or a media center (having music, DVDs, etc.)

In another aspect, a remote device capable of interacting with the gaming console can start the gaming console (regardless of its default state). Consistent with the present disclosure, a gaming controller can start a TV set-top box (e.g. the client component running on the gaming console), or alternatively, a remote control can start the gaming console. Because the various media are so well integrated in the present disclosure, just about any device (e.g. gaming controller, remote control, etc.) can interact with any title (e.g. game, DVR, etc.). FIG. 29 shows that the gaming console may have a special start button on a remote controlling device to launch either TV or a media center (having music, DVDs, etc.).

There are also additional scenarios where integration is especially useful. For instance, if a user presses a TV Start button on a remote control, the TV client can start automatically after confirming that the user wants to exit a game or other experience. Alternatively, in another scenario, the user can transition from TV to power off through the following means: pressing "Power" on the remote control, or console; pressing "Guide" on the remote and exiting selecting power off; or pressing and holding the "Guide" button on the remote or Xbox 360 game pad. Interestingly, background DVR can still continues to function/record when the console is "off" (i.e. when it appears to be "off" to a user).

In another scenario, if the user puts in a game disk, CD, DVD or HD-DVD, the game or movie will start automatically without confirmation. In yet another scenario, users can go from TV to the dashboard just like any other title. The user presses the guide button on the remote or gamepad, then pressing Y, then selecting "Yes" and pressing A. It should be noted that the TV remote control can be identical to a universal media console remote, except for a few cosmetic changes. A "Media Center" button (see e.g. FIG. 10) on these remotes can be replaced with an TV logo provided by a service provider.

If the client component is installed on a gaming console with a hard drive, and the user chooses to format the hard drive, any TV storage files may be erased. Other than the erasure of all recorded TV content, the client itself may not be impacted. Therefore, when the client is installed on gaming console with a hard drive, the text on the Format Hard Drive Screen may need to be changed to indicate this consequence of formatting.

In another aspect of the present disclosure, the notion of integration can entail chatting with other users while watching TV (much in the same manner that gamers can chat while playing online with other gamers). For instance, while watching TV on the gaming console, users can receive notifications from other users, while these latter users are also watching TV or playing a game on their own gaming console. This type of integration is, of course, merely exemplary, since not only chat sessions could be maintained while playing various media on the gaming console, but also other sessions, such as voice communication, video communication, and the like. In shot, whatever communication ability a typical gaming console has, this ability can be parlayed to be used in conjunction with TV and DVR services.

IV. An Exemplary Embodiment: Internet Protocol Television (IPTV)

As was mentioned above, in one aspect of the presently disclosed subject matter, television content can be viewed on gaming consoles. This television content, in the form of IPTV, for example (although IPTV is merely exemplary and not limiting), may refer to a digital television service that is delivered using Internet Protocol over some network. IPTV can be an integrated and comprehensive software platform developed specifically to deliver broadcast-quality video and new, integrated TV services over broadband networks. A platform associated with this aspect can combine features such as instant channel change (ICC) and multiple picture-in-picture (PIP) with traditional TV services such as broadcast programming, VOD, and DVR. Consistent with this aspect, software can be developed to integrate seamlessly and economically with other IP-based communications and media services for PCs, phones, and other consumer devices. IPTV can be used by telecommunications carriers and by cable operators looking to deliver differentiated TV services and experiences.

The IPTV disclosed above can enable the delivering of differentiated TV experiences consumers want. For example, a multimedia program guide can provide a unified user experience with integrated listings for broadcast and on-demand content, consistent navigation and search features, and picture-in-picture. A mini guide can provide a convenient way to browse guide listings without interrupting the show currently airing. Discretely displayed along the bottom of the screen, the mini guide can show comprehensive program information plus a real-time video stream for each show currently airing. Consumers can browse listings by shows currently airing, shows on next, and shows airing later.

The type of IPTV disclosed herein also allows for fast channel surfing. In other words, this aspect of the present disclosure enables channel changing in a fraction of a second, effectively eliminating the delay associated with tuning channels in a digital system. And it also allows features such: as integrated video-On-Demand (VOD), where all content—including HDTV—can be distributed on a subscription or a pay-per-play basis with content promotion integrated into the user experience. Furthermore, it can also result in increased bandwidth utilization. This means that advanced compression technology—a component of an IPTV platform—can deliver standard definition video at bit rates ranging between 1.5 and 1.8 Mbps (Megabits per second) and high definition programming ranging between 7 and 9 Mbps. That is as little as one half to one third of the bandwidth required by comparable MPEG-2 solutions.

As mentioned above already, digital video recording is another aspect of the present disclosure. With an internal or external hard disk drive, customers can pause, fast-forward, and rewind live and recorded content. With IPTV, multiple recordings can be made without the need for multiple tuners, so there is no need for costly hardware upgrades. IPTV can also incorporate various other industry standard products, such as (but not limited to) SQL Server, BizTalk® Server, Systems Management Server and Operations Management software, which help simplify the day-to-day management and maintenance of the IPTV solution.

In another aspect, IPTV can be connected to devices and media in order to provide simple, encrypted access from consumers' TVs to photos, music, and video located anywhere on a home network. It can enable consumers to review and record TV programming remotely via the Internet. And, it can use connected content, applications, and services in order to capitalize on built-in compression and Digital Rights Management (DRM) technologies to help deliver protected digital video, music, and game services to consumers through television set-top boxes and other devices, including hundreds of portable media products that support Windows Media technologies.

IPTV can involve connected communications to enable operators to display caller ID information, instant messages, e-mail, or SMS on the TV—even notify consumers about TV schedule changes as they occur. And lastly, it can use connected systems and delivery in order to provide use unified configuration, operation, and management tools and interfaces to manage legacy back-office systems, and integrate delivery of TV services with voice and data services over a common network architecture. Of course, these are merely exemplary and non-limiting aspect of IPTV that can be used in conjunction with the gaming consoles discussed above, and explained in more detail below.

V. Exemplary Gaming Console Environments

Gaming consoles can be used to view television, such as IPTV, record content, and provide various other functionalities. Referring next to FIG. 30, a block diagram shows an exemplary multimedia console that may be used in association with the aspects discussed above. For example, digital audio processing may be implemented in the multimedia console 100 of FIG. 30. The multimedia console 100 has a central processing unit (CPU) 101 having a level 1 (L1) cache 102, a level 2 (L2) cache 104, and a flash ROM (Read-only Memory) 106. The level 1 cache 102 and level 2 cache 104 temporarily store data and hence reduce the number of memory access cycles, thereby improving processing speed and throughput. The flash ROM 106 may store executable code that is loaded during an initial phase of a boot process when the multimedia console 100 is powered. Alternatively, the executable code that is loaded during the initial boot phase may be stored in a FLASH memory device (not shown). Further, ROM 106 may be located separate from CPU 101.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 and CPU 101 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory unit 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity, 3D, surround, and stereo audio processing according to aspects of the present invention described above. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on or rebooted, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 may allow one or more users to interact with the system, watch movies, listen to music, and the like. However, with the integration of broadband connectivity made available through the network interface 124 or the wireless adapter 148, the multimedia console 100 may further be operated as a participant in a larger network community.

Finally, it should also be noted that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing device may generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, integrated gaming console and television and recording media were disclosed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A system for recording media on a gaming console, comprising:
   a first subsystem that receives and process a media title data;
   a second subsystem that records said media title data;
   a first memory on said second subsystem reserved for recording said media title data; and
   a second memory reserved for a gaming title data to maintain uninterrupted use of a game application while recording said media title data on said gaming console, wherein a processing time reserved for said uninterrupted use of said game application is about one order of magnitude greater than a processing time reserved for said recording of said media title data.

2. The system according to claim 1, wherein said recording is performed using at least one of (a) an NTSC format or (b) a PAL format.

3. The system according to claim 1, wherein said media title data is at least one of (a) a dashboard, (b) a DVD movie, (c) a television client, or (d) video on demand (VOD).

4. The system according to claim 1, wherein said system presents a menu to a user for recording said media title data, wherein said menu is integrated with other media functionalities.

5. The system according to claim 1, wherein said second subsystem records said media title data from a television title in the background while in the foreground said gaming title data is executing.

6. The system according to claim 1, further comprising a third subsystem configured to allow users to adjust memory resources for at least one of said media title data or said gaming title data.

7. A computer implemented method for recording media on a gaming console, comprising:
   receiving media title data on said gaming console;
   reserving a first memory on said gaming console for said media title data and a second memory on said gaming console for a gaming title data;
   recording said media title data to said first memory on said gaming console; and
   storing said gaming title data on said second memory to maintain uninterrupted use of a game application while recording said media title data on said gaming console, wherein a processing time reserved for said uninterrupted use of said game application is about one order of magnitude greater than a processing time reserved for said recording of said media title data.

8. The computer implemented method according to claim 7, wherein said recording is performed using at least one of (a) an NTSC format or (b) a PAL format.

9. The computer implemented method according to claim 7, wherein said media title data is at least one of (a) a dashboard, (b) a DVD movie, (c) a television client, or (d) video on demand (VOD).

10. The computer implemented method according to claim 7, further comprising presenting a menu to a user for recording said media title data, wherein said menu is integrated with other media functionalities.

11. The computer implemented method according to claim 7, further comprising recording said media title data from a television title in the background while in the foreground said gaming title data is executing.

12. The computer implemented method according to claim 7, further comprising allowing users to adjust memory resources for at least one of said media title data or said gaming title data.

13. A tangible computer readable storage medium bearing computer executable instructions for recording media on a gaming console, comprising:
   a first instruction for receiving and processing media title data;
   a second instruction for reserving a first memory on said gaming console for said media title data and a second memory on said gaming console for gaming title data;
   a third instruction for recording said media title data to said first memory on said gaming console; and
   a fourth instruction for storing said gaming title data on said second memory to maintain uninterrupted use of a game application while recording said media title data on said gaming console, and wherein a processing time reserved for said uninterrupted use of said game application is about one order of magnitude greater than a processing time reserved for said recording of said media title data.

14. The tangible computer readable storage medium according to claim 13, wherein said title data is at least one of (a) a dashboard, (b) a DVD movie, (c) a television client, or (d) video on demand (VOD).

15. The tangible computer readable storage medium according to claim 13, further comprising presenting a menu to a user for recording said media title data, wherein said menu is integrated with other media functionalities.

16. The tangible computer readable storage medium according to claim 13, further comprising recording said media title data from a television title in the background while in the foreground said gaming title data is executing.

17. The tangible computer readable storage medium according to claim 13, further comprising allowing users to adjust memory resources for at least one of said media title data or said gaming title data.

\* \* \* \* \*